US 7,960,919 B2

(12) United States Patent
Furukawa

(10) Patent No.: US 7,960,919 B2
(45) Date of Patent: Jun. 14, 2011

(54) ILLUMINATION APPARATUS AND IMAGE DISPLAY APPARATUS

(75) Inventor: Norimasa Furukawa, Tokyo (JP)

(73) Assignee: Sony Corporation (JP)

( * ) Notice: Subject to any disclaimer, the term of this patent is extended or adjusted under 35 U.S.C. 154(b) by 207 days.

(21) Appl. No.: 11/314,769

(22) Filed: Dec. 21, 2005

(65) Prior Publication Data

US 2006/0158130 A1 Jul. 20, 2006

(30) Foreign Application Priority Data

Dec. 22, 2004 (JP) ................. P2004-371234

(51) Int. Cl.
H05B 37/02 (2006.01)
(52) U.S. Cl. .......... 315/291; 315/209 R; 315/224
(58) Field of Classification Search .......... 315/291, 315/360, 106, 241 P, 158, 101, 227 R, 77, 315/185 S, 219, 82, 246, 225, 308, 209 R, 315/240, 224, 307; 363/97; 331/11, 1 A, 331/2, 17; 431/359; 455/260; 370/249; 330/279, 52, 149, 129; 375/327, 376
See application file for complete search history.

(56) References Cited

U.S. PATENT DOCUMENTS

| | | | | |
|---|---|---|---|---|
| 3,577,051 | A * | 5/1971 | Montague | 318/815 |
| 3,985,528 | A * | 10/1976 | Revell | 55/352 |
| 4,342,947 | A * | 8/1982 | Bloyd | 315/199 |
| 5,726,535 | A * | 3/1998 | Yan | 315/185 R |
| 6,452,217 | B1 * | 9/2002 | Wojnarowski et al. | 257/99 |
| 6,480,337 | B2 * | 11/2002 | Inoguchi et al. | 359/630 |
| 6,828,740 | B2 * | 12/2004 | Takahashi et al. | 315/291 |
| 2002/0043943 | A1 * | 4/2002 | Menzer et al. | 315/291 |
| 2003/0227434 | A1 | 12/2003 | Lo et al. | |
| 2006/0012988 | A1 * | 1/2006 | Hsieh et al. | 362/231 |
| 2006/0071806 | A1 | 4/2006 | Hollnberger et al. | |

FOREIGN PATENT DOCUMENTS

| | | |
|---|---|---|
| DE | 101 03 422 A1 | 8/2002 |
| DE | 10 2004 047 681 A1 | 4/2006 |
| JP | 62-174358 U | 11/1987 |
| JP | 63-64059 U | 4/1988 |
| JP | 3-41390 U | 4/1991 |
| JP | 5-066718 A | 3/1993 |
| JP | 05 198843 A | 8/1993 |
| JP | 61-88457 A | 7/1994 |
| JP | 62-42733 A | 9/1994 |
| JP | 2001-272938 A | 10/2001 |
| JP | 2004-311635 A | 11/2004 |

OTHER PUBLICATIONS

King, et al, Directing Current, Hands on Physics, 2002, http://hop.concord.org/e1/e1e3.html.* Japanese Office Action issued on Jun. 24, 2008 in connection with corresponding Japanese Patent Application No. 2004-371234 (3 pages).

* cited by examiner

Primary Examiner — Douglas W Owens
Assistant Examiner — Jae K Kim
(74) Attorney, Agent, or Firm — Lerner, David, Littenberg, Krumholz & Mentlik, L.L.P.

(57) ABSTRACT

An illumination apparatus is configured simply in a reduced scale while a light emitting diode is used as a light emitting source for illumination. The illumination apparatus includes an LED driving block including an LED bridge circuit formed from a bridge connection of a plurality of diode series circuits each of which is formed from a series connection of a plurality of light emitting diodes and a rectifying diode. A load resistor is connected to a rectification output of the LED bridge circuit. When an AC voltage is input to the LED driving block, the LED bridge circuit rectifies the AC voltage, and the resulting rectification current is used as driving current to drive the light emitting diodes to emit light.

10 Claims, 22 Drawing Sheets

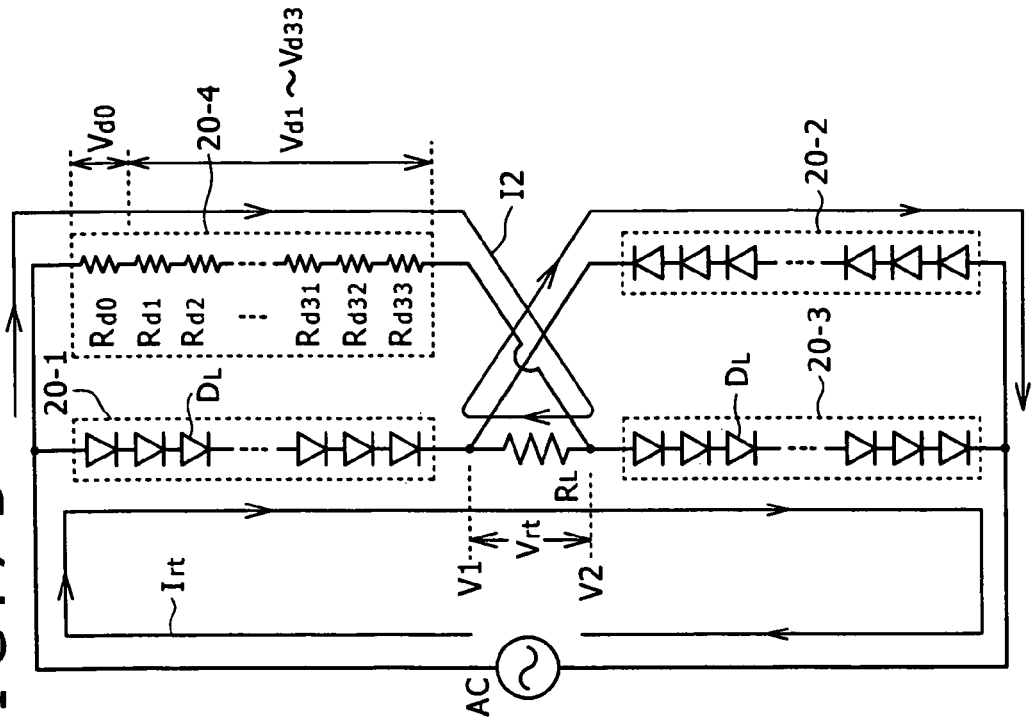
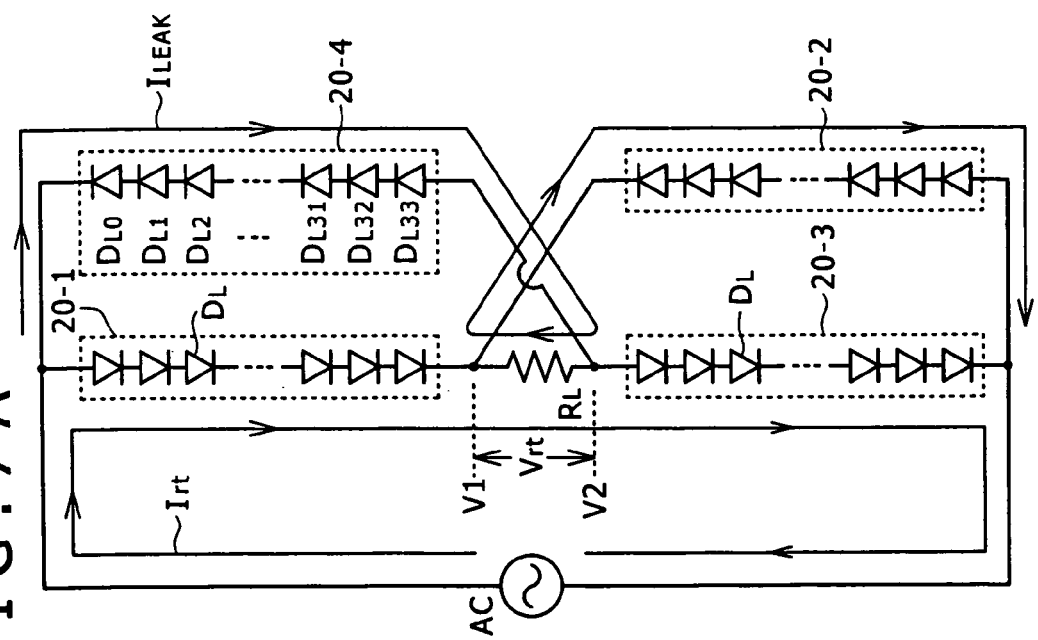

ILLUMINATION APPARATUS AND IMAGE DISPLAY APPARATUS

CROSS-REFERENCE TO RELATED APPLICATIONS

The present application claims priority from Japanese Application No. 2004-371234 filed Dec. 22, 2004, the disclosure of which is hereby incorporated by reference herein.

BACKGROUND OF THE INVENTION

This invention relates to an illumination apparatus in which a light emitting diode element is used and an image display apparatus which uses an illumination apparatus of the type described as a light source.

In a display device such as, for example, an LCD (Liquid Crystal Display) device, a light source (illumination apparatus) called backlight is used to display an image by visible radiations. In recent years, an illumination apparatus has been proposed wherein a light emitting diode (LED) element (hereinafter referred to as "light emitting diode") is used for the backlight. Where a light emitting diode is used for a backlight, usually a technique wherein light emitting diodes which emit lights of the primary colors of red (R), green (G) and blue (B) are used and lights obtained by causing the light emitting diodes to emit light are optically mixed by additive synthesis to obtain white light is adopted.

In order to actually drive such a light source in which light emitting diodes corresponding to the primary colors of R, G and B as described above are used so that the light source actually emits light, it is a possible idea to adopt a configuration similar to that of a matrix driving system which is used to display an image.

According to the matrix driving system, pixels are disposed in a matrix along an X direction (horizontal direction) and a Y direction (vertical direction), and suitable electrodes are disposed along the X direction (horizontal direction) and the Y direction (vertical direction) in a corresponding relationship to the pixels. Then, the electrodes are driven at required timings based on a setting of the pixels to be driven to emit light and a setting of timings at which the pixels are to be driven to emit light. It is to be noted that the driving timings at this time differ depending upon the difference of the driving system within the criterion of the matrix driving system. The pixels are driven in this manner to represent, for example, gradations for the individual pixels to display an image of visible radiations on an entire screen.

However, the driving circuit system of such a matrix system as described above is complicated and requires a high cost. Particularly with illumination applications to a backlight or the like, the power consumption by the light emitting diodes is comparatively high. Under present conditions, parts such as an LSI for implementing matrix driving which are ready for such high power driving as described above are little available. From such a situation as just described, it is considered impractical to adopt the driving circuit system of the matrix system as a configuration for driving the light source.

Where a backlight is formed using light emitting diodes corresponding to the primary colors of R, G and B, the difference in light emission efficiency, voltage drop, power consumption and so forth between the light emitting diodes of the colors of R, G and B matters. The semiconductor composition of a light emitting diode differs among different colors, and this appears as such a difference in characteristic among the light emitting diodes as described above. Therefore, it is considered that, in order to obtain good white color, it is advantageous to drive the light emitting diodes of the colors of R, G and B independently of each other and adjust the light quantity for each of the colors.

From such a background as described above, in order to drive a backlight formed using light emitting diodes corresponding to the three primary colors of R, G and B, the following basic configuration is adopted popularly.

First, as a minimum unit of a block of a backlight, a light emitting diode cell 100 is provided in such a manner as seen in FIG. 18A. The light emitting diode block or cell is formed by preparing a predetermined number of light emitting diodes of predetermined colors, disposing the light emitting diodes at predetermined positions of a board or the like and electrically connecting the disposed light emitting diodes in accordance with a predetermined pattern. In the light emitting diode block shown in FIG. 18A, totaling six diodes are prepared including two red light emitting diodes DL-R corresponding to R (red), green light emitting diodes DL-G corresponding to G (green) and two blue light emitting diodes DL-B corresponding to B (blue) The light emitting diodes are disposed in order of blue-green-red-blue-green-red from the left side to the right side as seen in FIG. 18A. Further, the light emitting diodes of each color are connected in series with the same polarity.

It is to be noted that light emitting diode elements in an LED cell may possibly be disposed in different disposition patterns. The disposition pattern of light emitting diode elements is determined, for example, in response to the rated specifications, light emitting efficiencies and so forth of light emitting diodes to be used actually so that white light of a good quality is obtained as mixed color of R, G and B.

The light emitting diode cell 100 formed in this manner can be connected to another light emitting diode cell 100 of the same type with regard to both of the anode side and the cathode side of the series connections of the light emitting diodes of the individual colors of R, G and B as seen in FIG. 18A. Where the light emitting diode cells 100 are connected to each other in this manner, the number of series connections of the light emitting diodes corresponding to each of the colors of R, G and B increases in accordance with the number of LED cells connected.

Thus, a required number of light emitting diode cells 100 are connected to form a block. As a particular example, three light emitting diode cells 100 are connected to form one block in FIG. 18B. Here, the block is referred to as LED cell block 101. Since one light emitting diode cell 100 includes two light emitting diodes for each of the colors of R, G and B, the number of colors of the light emitting sources of the light emitting diode cell 100 is represented as (2R, 2G, 2B). In the arrangement of FIG. 18B, since the LED cell block 101 is formed from three light emitting diode cells 100, the number of colors can be represented as 3 (2G, 2R, 2B)=(6G, 6R, 6B).

Then, such LED cell blocks 101 formed in such a manner as described above are disposed on a plane to construct, for example, a panel having a function as a backlight. An example of a backlight panel 110 formed using the LED cell block 101 shown in FIG. 18B is shown in FIG. 19.

Referring to FIG. 19, the LED cell blocks 101 are disposed in a matrix of 5 rows×4 columns including rows g1 to g5 and columns m1 to m4 to form the backlight panel 110. The backlight panel 110 includes a total of 6×5×4=120 red light emitting diodes DL-R. Similarly, the backlight panel 110 includes totaling 120 green light emitting diodes DL-G and 120 blue light emitting diodes DL-B. Consequently, the backlight panel 110 includes totaling 360 (=120×3) light emitting diodes.

As described above, it is considered impractical to perform light emission driving of a large number of light emitting diodes, which emit lights of the different colors of R, G and B, in accordance with the matrix driving system in this manner so that good white light may be obtained, and under present conditions, driving, for example, by such a method as described below is used popularly.

FIG. 20 illustrates a concept of a configuration for driving the light emitting diodes of the backlight panel of the structure shown in FIG. 19. Referring to FIG. 20, the LED cell blocks 101 which form the backlight panel are connected such that the LED cell block 101s in each of the rows g1 to gn are connected to each other in a horizontal direction. Consequently, in each of the rows g1 to gn, the light emitting diodes corresponding to each of the colors of R, G and B are connected in series in order of the columns m1 to mn.

For the light emitting diodes connected in such a connection scheme as described above, three DC-DC converters 120-R, 120-G and 120-B corresponding to the colors of the R, G and B are provided for each of the rows g1 to gn. Then, an output of the DC-DC converter 120-R is connected to the anode side terminal of the series connection circuit of the red light emitting diodes DL-R (that is, to the connection position on the anode side of the LED cell block 101 positioned in the column m1). Similarly, the DC-DC converters 120-G and 120-B are connected to the anode side end portion of the series connection circuit of the green light emitting diodes DL-G and the anode side end portion of the series connection circuit of the blue light emitting diodes DL-B, respectively.

In the configuration described above, DC driving current is supplied from a DC power supply outputted from the DC-DC converter 120-R to the red light emitting diodes DL-R connected in series along one row to drive the red light emitting diodes DL-R to emit light. Similarly, the green light emitting diodes DL-G connected in series along the same row are driven from a DC power supply outputted from the DC-DC converters 120-G to emit light. Further, the blue light emitting diodes DL-B connected in series along the same row are driven by a DC power supply outputted from the DC-DC converters 120-B to emit light. Such a configuration of a driving circuit system as just described is formed for each row.

FIG. 21 shows an actual configuration of a drive circuit for a series connection circuit of light emitting diodes. Referring to FIG. 21, a DC voltage Vcc which is an output of a DC-DC converter 120 is applied to the anode side terminal of an LED series circuit 130 formed from light emitting diodes connected in series so as to interpose a resistor R42. Consequently, driving current ILED flows through the light emitting diodes DL which form the LED series circuit 130.

Further, the DC-DC converter 120 performs constant current control such that it detects a voltage drop of the predetermined DC voltage Vcc across the resistor R42 at a predetermined timing and performs constant current control so that the driving current ILED to flow may be fixed. For the constant current control, a resistor R41, a capacitor C41, a switching transistor Q12 and a sampling timing production/switch driving circuit 131 are provided additionally. The sampling timing production/switch driving circuit 131 in this instance generates a sample hold timing based on a PWM signal (rectangular waveform signal) inputted thereto through an AND gate 132 and on/off controls the switching transistor Q12 which functions as a sample hold switch. Consequently, the DC-DC converter 120 detects a voltage drop across the resistor R42 at the sample hold timing. The DC-DC converter 120 performs constant current control of the power to be supplied as the DC voltage Vcc in response to the detected voltage drop level. Further, a control section (CPU) 140 controls a level shift circuit 141 in response to a result of detection of a sensor 142 which detects, for example, the temperature so that a reference level Lref to be used for the constant current control by the DC-DC converter 120 can be varied. Consequently, an appropriate constant current amount corresponding to a temperature variation can be obtained for the driving current ILED.

Further, a PWM signal supplied from a driver not shown is used to perform on/off control of a transistor Q11 in a period of the PWM signal to control continuity/discontinuity of the driving current ILED. Consequently, the continuity time of the driving current ILED per unit time is controlled in response to the pulse width of the PWM signal within one period. In other words, the amount of light to be emitted from the light emitting diode can be controlled. Further, an output of the AND gate 132 to which the PWM signal and the on/off signal are inputted is applied to the gate of the transistor Q11. In particular, the light quantity control (and constant current control) of the light emitting diode described above can be set between on and off by changeover of the on/off signal between the H (High) level and the L (Low) level. The on/off signal is outputted, for example, from the control section 140 which performs changeover between the H level and the L level in response to an operation situation and so forth.

FIG. 22 shows a configuration of a control loop for the light quantity control of light emitting diodes described above. It is to be noted that, in FIG. 22, like elements to those in FIG. 21 are denoted by like reference characters and overlapping description of the common elements is omitted herein to avoid redundancy.

Referring to FIG. 22, a photosensor 150 detects a light quantity of a light emitting diodes DL which form the LED series circuit 130 as a current amount and outputs the detected current amount to an I-V amplifier 151. The I-V amplifier 151 is an amplifier formed from an operational amplifier OP, a resistor R31, a capacitor C31, another resistor R32 and another capacitor C32 connected in such a manner as seen in FIG. 22. The I-V amplifier 151 operates so as to convert a current amount inputted thereto into a voltage value. The analog voltage value outputted from the I-V amplifier 151 is converted into a digital value by an A/D converter 152 and inputted as information of a detected light quantity value to the control section 140.

The control section 140 refers to light quantity control data stored in a memory 153, for example, of the nonvolatile type to acquire a control value corresponding to the detected light quantity value inputted thereto and controls a driver 154 with the control value. The driver 154 varies the pulse width of the PWM signal with the control value and applies the PWM signal of the varied pulse width to the transistor Q11. Consequently, an appropriate light quantity is obtained and the emitted light quantity of the light emitting diodes DL is variably controlled. Such light quantity control is performed in order to maintain, for example, appropriate white light. In short, the emitted light quantity of the light emitting diodes corresponding to the individual colors of R (red), G (green) and B (blue) are controlled so that the emitted light quantity of the colors of R (red), G (green) and B (blue) are well balanced to obtain appropriate white light. Since the light emission efficiency of the light emitting diodes differs depending upon the color of the emitted light as described hereinabove, it is considered that, under present conditions, it is appropriate to perform light quantity control of the light emitting diodes using control loops independent of each other for the individual colors in such a manner as described above.

It is to be noted that related apparatus are disclosed, for example, in Japanese Patent Laid-Open No. 2001-272938 and Japanese Utility Model Laid-Open No. Sho 63-64059.

The configuration of the illumination apparatus as a backlight shown in FIGS. 18A to 22 can be formed in a circuit scale suppressed when compared with an alternative configuration wherein driving, for example, according to a matrix driving method is used. However, the configuration is still obliged to have a proportionately large circuit scale.

For example, according to the configuration, a DC-DC converter is used to obtain DC current in order to supply power for driving light emitting diodes as seen in FIG. 20. Where a light emitting diode is used for the illumination, proportionately high power is required, and therefore, such a countermeasure is taken that a number of DC-DC converters, for example, suitable for a series connection circuit of light emitting diodes are provided to achieve stabilized light emitting operation. In other words, a comparatively great number of DC-DC converters are required, and this makes reduction of the circuit scale difficult. A DC-DC converter includes a large-size part such as, for example, a transformer.

Further, provision of such a large number of DC-DC converters also increases the total power loss of the DC-DC converters and accordingly is disadvantageous in terms of the power consumption.

Further, as seen from FIGS. 21 and 22, also the control circuit system for performing the light quantity control, constant current control and so forth of the light emitting diodes must be provided for each of series connection circuits of the light emitting diodes. Also this makes a factor of obstructing reduction of the circuit scale.

In this manner, also under present conditions, reduction of the circuit scale of an apparatus wherein a light emitting diode is used for a light emitting source for illumination remains at a certain level, and it is demanded to form an apparatus of the type described in a simpler configuration of a reduced scale.

It is desirable to provide an illumination apparatus and an image display apparatus which are configured simply in a reduced scale while a light emitting diode is used as a light emitting source for illumination.

SUMMARY OF THE INVENTION

In order to addresses the above-identified, and other problems, according to an embodiment of the present invention, there is provided an illumination apparatus including a bridge rectification circuit for receiving and rectifying an input AC voltage, the bridge rectification circuit being formed from a bridge connection of a plurality of unit series circuits each of which is formed from a series connection of a plurality of light emitting diode elements.

According to another embodiment of the present invention, there is provided an image display apparatus including a light source section for emitting light as a light source in order to display an image with the light, the light source section including a bridge rectification circuit for receiving and rectifying an input AC voltage, the bridge rectification circuit being formed from a bridge connection of a plurality of unit series circuits each of which is formed from a series connection of a plurality of light emitting diode elements.

In both the illumination apparatus and the image display apparatus, a bridge connection of a plurality of unit series circuits each of which is formed from a series connection of a plurality of light emitting diode elements is provided as a bridge rectification circuit. The bridge rectification circuit formed in this manner includes a considerably great number of light emitting diode elements, although the number depends upon the number of light emitting diode elements which form a unit series circuit. Then, if an AC voltage is applied to the bridge rectification circuit, the rectification current flowing as a result of the rectification operation of the bridge rectification circuit serves as a driving current for the light emitting diode elements and drives the light emitting diode elements to emit light.

In short, according to the present invention, it is possible to input an AC voltage to drive a comparatively great number of light emitting diode elements to emit light. This eliminates the necessity for providing, in order to drive the light emitting diode elements, a DC-DC converter for each series connection circuit of light emitting diode elements in such a manner as in the conventional illumination apparatus described hereinabove.

With the illumination apparatus and the image display apparatus, a configuration for driving for light emission in an apparatus which uses light emitting diode elements for illumination (for a light source section) can be reduced significantly. Consequently, such merits as reduction in size and weight and reduction in power consumption and so forth of the apparatus can be anticipated.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 7A and 7B are circuit diagrams illustrating a reverse direction voltage caused by leak current of light emitting diodes in the LED driving block of FIG. 4;

DETAILED DESCRIPTION

First, a bridge rectification circuit which is used in an illumination apparatus according to the present invention is described with reference to FIGS. 1A to 3.

Figure 1A:
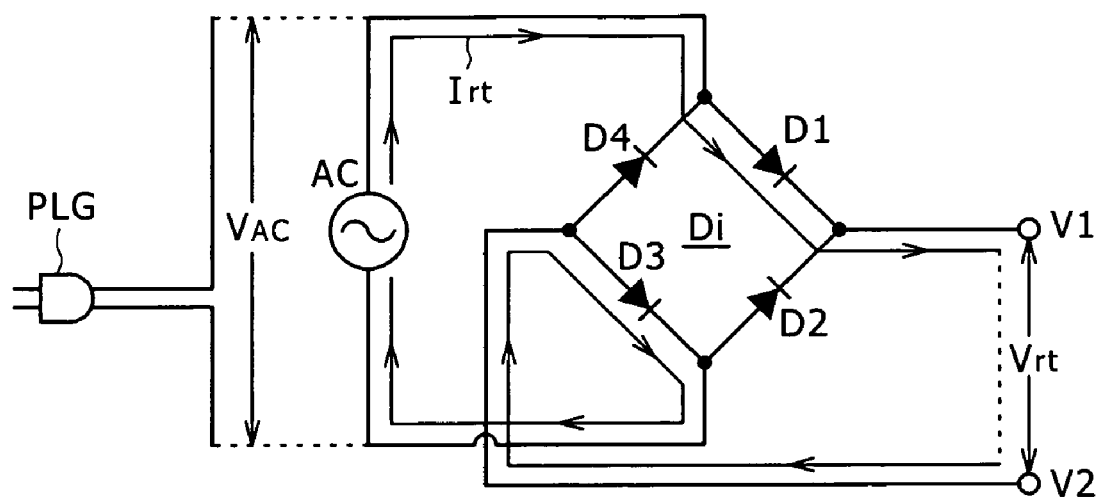
FIGS. 1A and 1B are circuit diagrams showing a bridge rectification circuit which is used in an illumination apparatus according to the present invention.
Figure 1B:
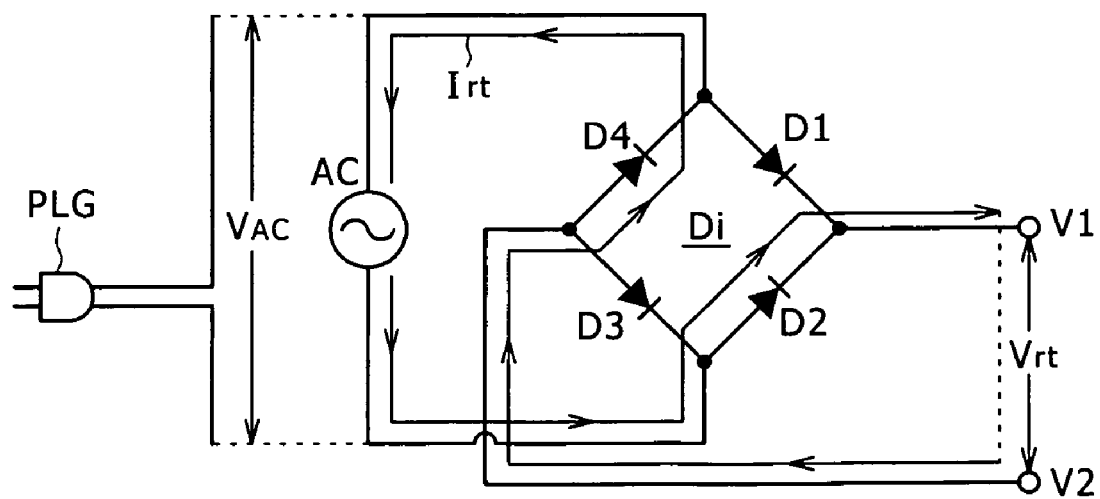

Referring first to FIGS. 1A and 1B, there is shown a bridge rectification circuit Di. The bridge rectification circuit Di includes four rectification diodes D1, D2, D3 and D4 as rectification devices connected in a bridge connection as seen in FIGS. 1A and 1B.

In the bridge rectification circuit Di, a node between the anode of the rectification diode D1 and the cathode of the rectification diode D4 is used as a positive input terminal and connected to a positive line of an AC voltage AC. Meanwhile, another node between the anode of the rectification diode D2 and the cathode of the rectification diode D3 is used as a negative input terminal and connected to a negative line of the AC voltage AC. The AC voltage AC is supplied actually, for example, by inserting an AC plug PLG into a socket as seen in FIGS. 1A and 1B.

A further node between the cathode of the rectification diode D1 and the cathode of the rectification diode D2 is used as a positive output terminal, and a still further node between the anode of the rectification diode D3 and the anode of the rectification diode D2 is used as a negative output terminal.

FIG. 1A shows a path of rectification current Irt within a period of one half-wavelength in which the AC voltage AC has the positive polarity. The rectification current Irt when the AC voltage AC has the positive polarity flows along a path which includes the rectification diodes D1 and D3.

FIG. 1B shows another path of the rectification current Irt within a period of another half-wavelength period in which the AC voltage AC has the negative polarity. The rectification current Irt in this instance flows along another path which includes the rectification diodes D2 and D4.

Figure 2:
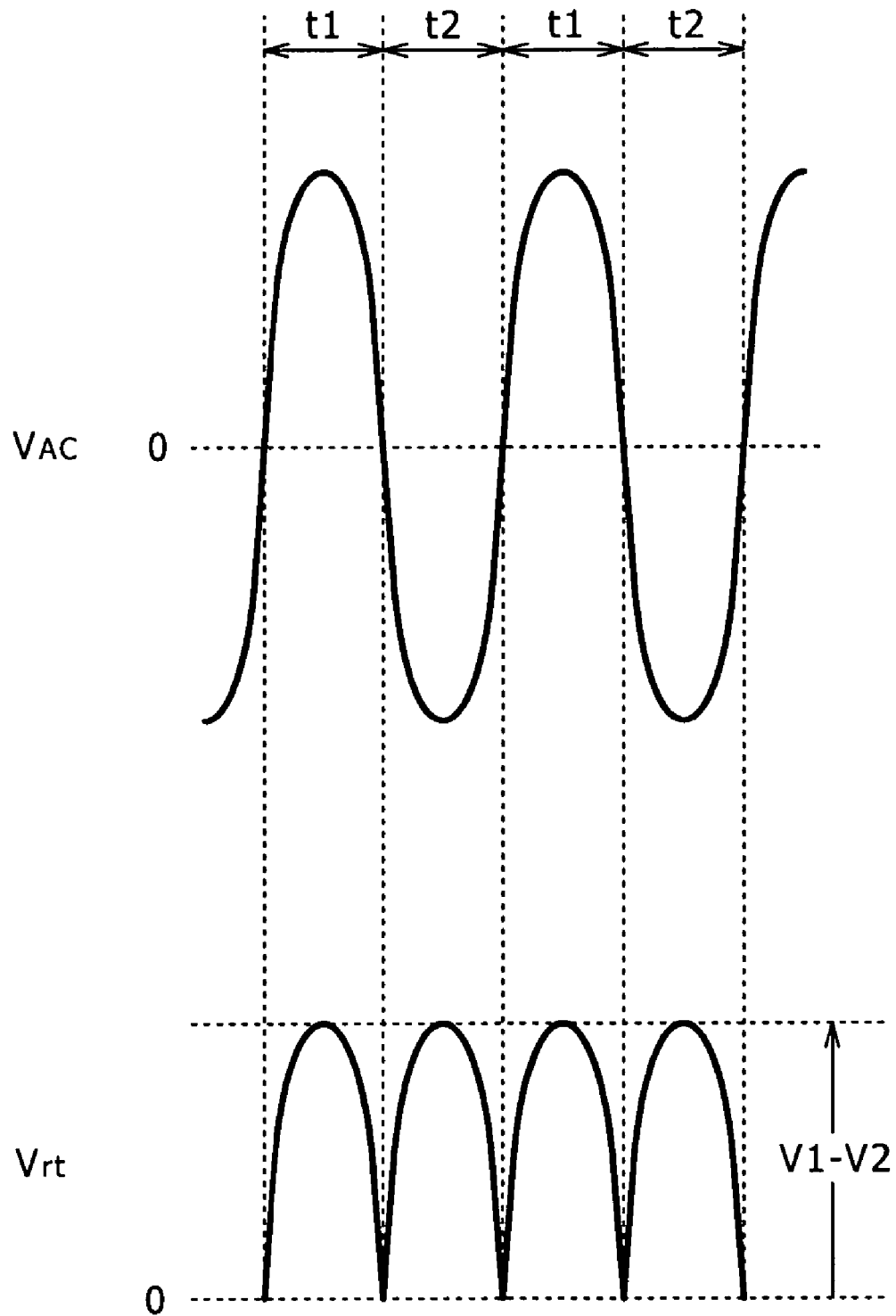
FIG. 2 is a waveform diagram illustrating operation of the bridge rectification circuit shown in FIGS. 1A and 1B.

FIG. 2 illustrates an AC voltage VAC and a rectification voltage Vrt as operation waveforms of the bridge rectification circuit Di shown in FIGS. 1A and 1B. The AC voltage VAC is supplied from the AC voltage AC and has a sine waveform which exhibits the positive polarity within one half period denoted as period t1 but exhibits the negative polarity within another half period denoted as period t2.

The rectification voltage Vrt has a waveform of a pulsating voltage having a wave height of a potential difference (V1−V2) between a potential (ground potential) V1 at the positive output terminal and a potential (ground potential) V2 of the negative output terminal obtained by a rectification operation of the bridge rectification circuit Di.

The rectification voltage Vrt having a level (wave height value) as the difference between the potentials V1 and V2 flows through two rectification diodes within each of the periods in which the AC voltage AC has the positive and negative polarities. Therefore, the rectification voltage Vrt has a level (wave height value) obtained as the difference of a voltage drop by the two rectification diodes from the level (wave height value) of the AC voltage VAC. For example, if the voltage drop by one rectification diode is 0.3 V, then the rectification voltage Vrt has a level lower by 0.6 V (=0.3 V×2) than the AC voltage VAC.

Figure 3:
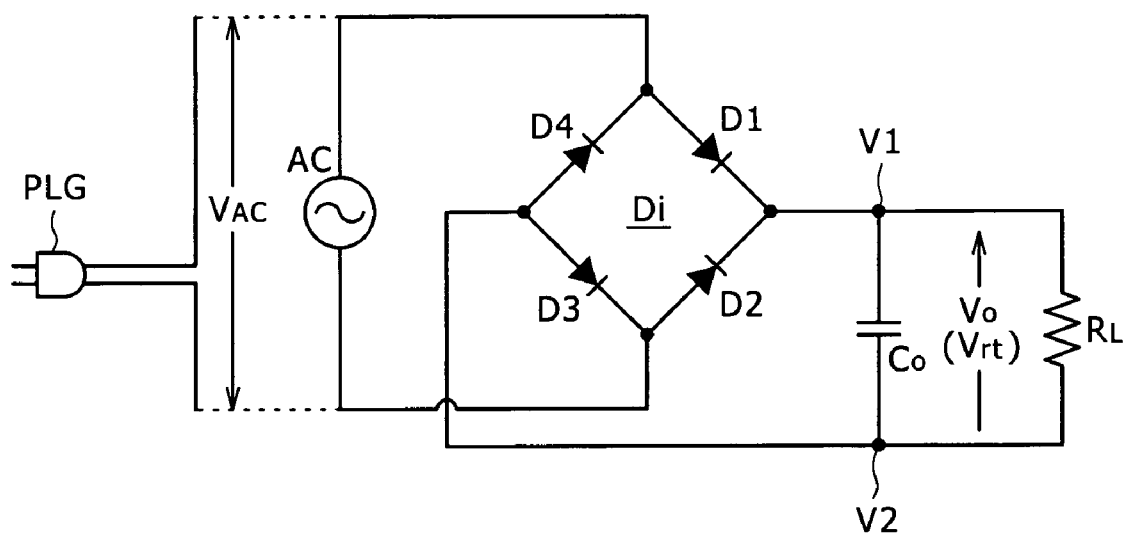
FIG. 3 is a circuit diagram showing an example of a configuration of a popular rectification smoothing circuit which includes a smoothing capacitor provided additionally to a bridge rectification circuit.

Usually, the bridge rectification circuit Di shown in FIGS. 1A and 1B includes a capacitor Co connected between the positive output terminal and the negative output terminal in such a manner as seen in FIG. 3. The capacitor Co smoothes the rectification voltage Vrt in the form of a pulsating voltage into a DC voltage and supplies the DC voltage as power to a load RL.

An illumination (light source) apparatus to which the present invention is applied uses a light emitting diode as a light emitting source. The illumination apparatus has such a basic configuration as shown in FIG. 4.

Figure 4:
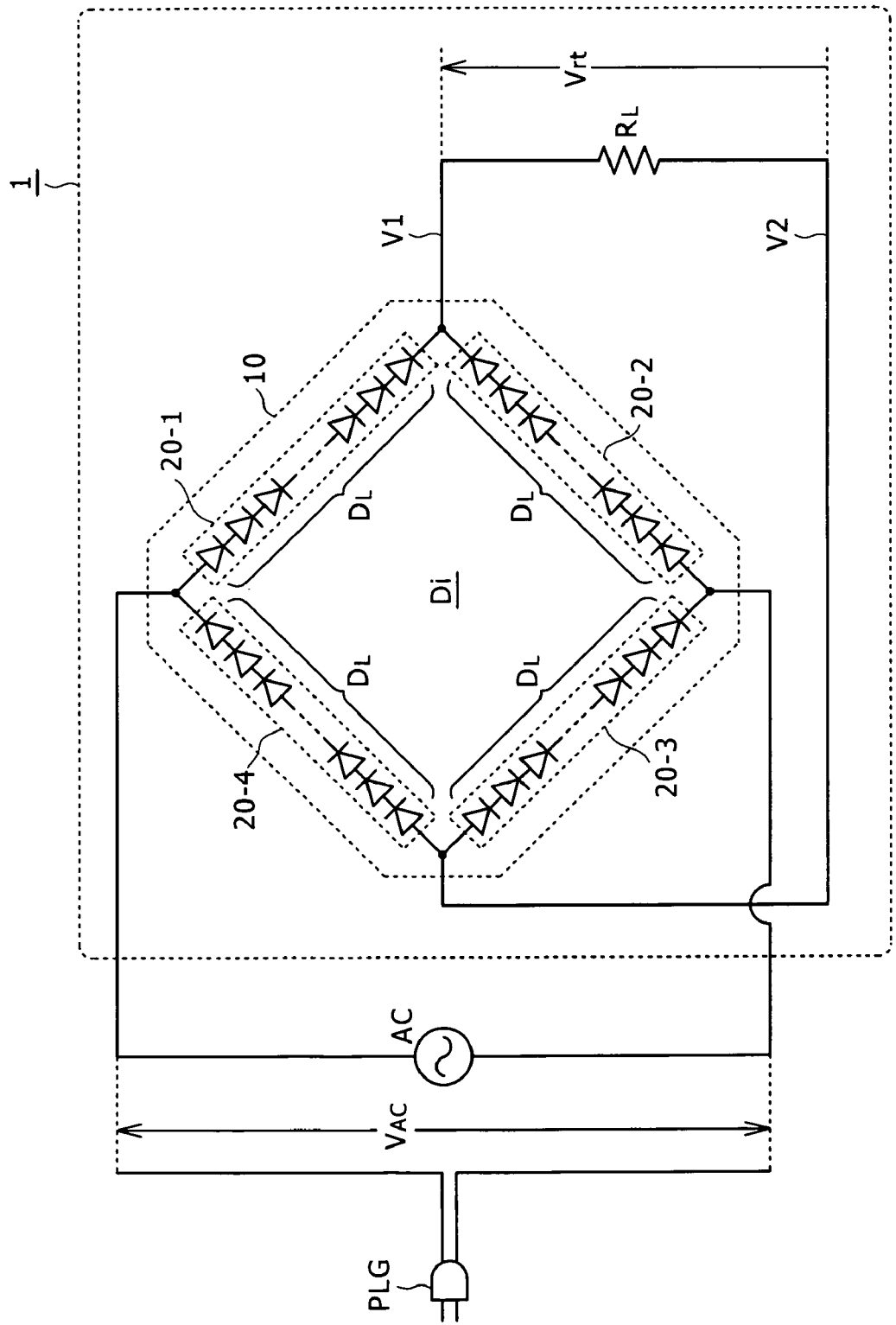
FIG. 4 is a circuit diagram showing a basic configuration of an LED driving block to which the present invention is applied.

Referring to FIG. 4, the basic configuration of the illumination apparatus of the present embodiment is formed as a single LED driving block 1. The LED driving block 1 includes diode series circuits 20-1, 20-2, 20-3 and 20-4 each including a plurality of light emitting diodes connected in series with the same polarity. Each of the diode series circuits 20 (20-1, 20-2, 20-3 and 20-4) corresponds to one LED series circuit 130 of the conventional illumination apparatus. The diode series circuits 20-1, 20-2, 20-3 and 20-4 are connected in such a bridge connection as shown in FIG. 4 so that they generally form a single bridge rectification circuit. In the following description of the present embodiment, the bridge rectification circuit is referred to as LED bridge circuit 10.

In the LED bridge circuit 10, a node between the anode side end of the diode series circuit 20-1 and the cathode side end of the diode series circuit 20-4 is used as a positive input terminal, and another node between the anode side end of the diode series circuit 20-2 and the cathode side end of the diode series circuit 20-3 is used as a positive input terminal. Further, the cathode side ends of the diode series circuits 20-1 and 20-2 are used as a positive side terminal, and the anode side ends of the diode series circuits 20-3 and 20-4 are used as a negative output terminal.

Then, a positive line and a negative line of an AC voltage AC are connected to the positive input terminal and the negative input terminal of the LED bridge circuit 10 in a similar manner as in the case of the bridge rectification circuit Di shown in FIG. 1. Further, the load resistor RL is inserted between the positive output terminal and the negative output terminal of the LED bridge circuit 10 to form the LED driving block 1.

Figure 5B:
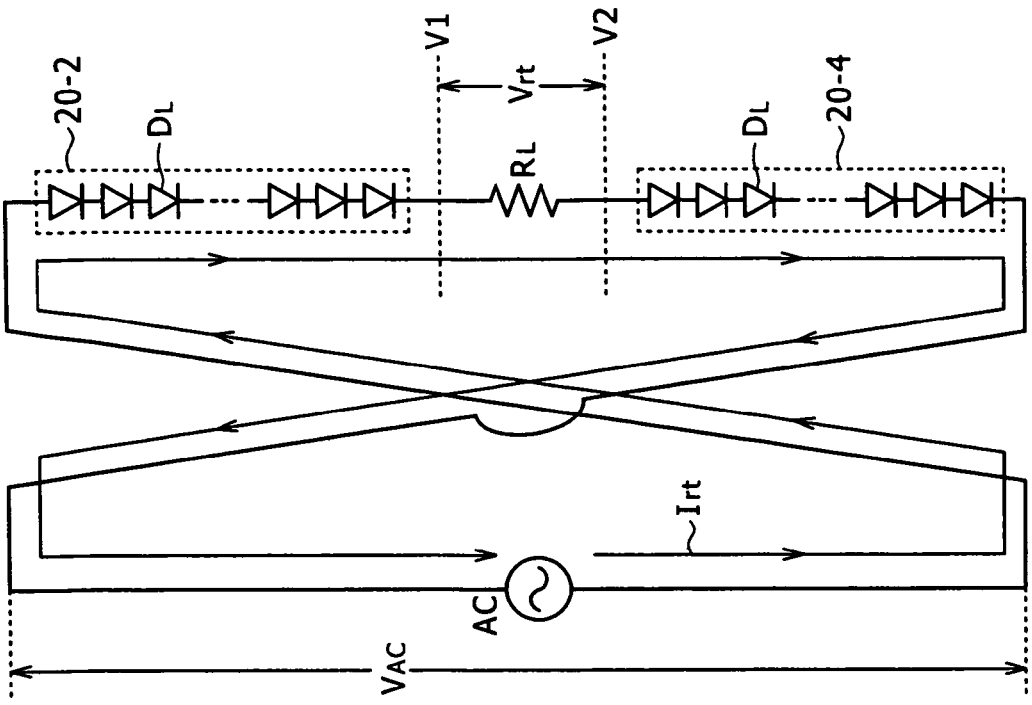
FIGS. 5A and 5B are circuit diagrams illustrating operation of the LED driving block of FIG. 4 when the AC input voltage is positive and negative, respectively.
Figure 5A:
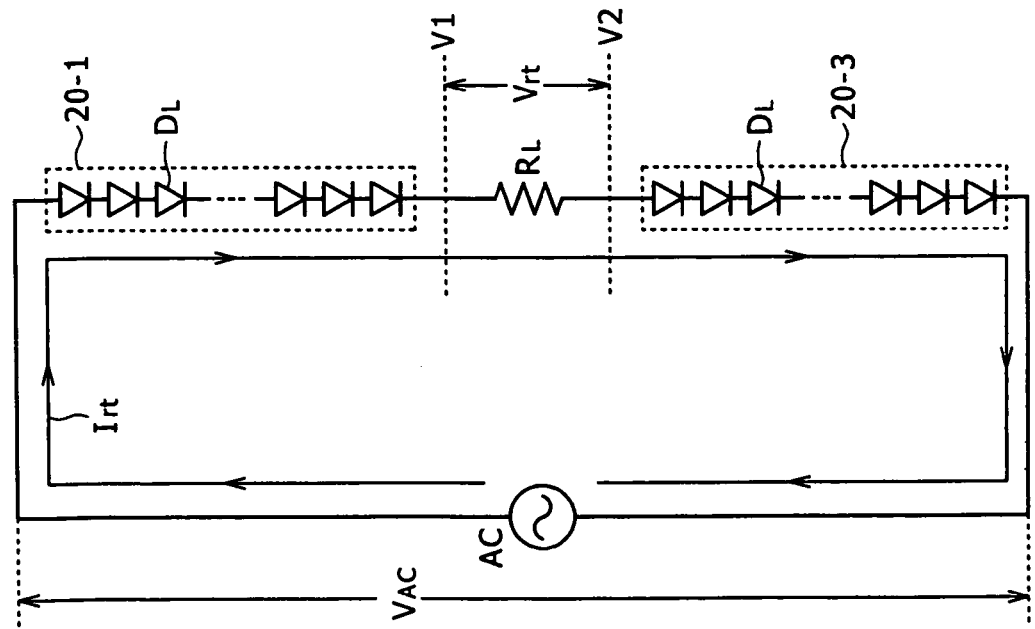

Operation of the LED driving block 1 formed in this manner is described with reference to FIGS. 5A and 5B. FIGS. 5A and 5B are equivalent circuit diagrams of the LED driving block 1 corresponding to operation obtained within periods of a half-wavelength in which the AC voltage AC has the positive polarity and the negative polarity.

Within a period of a half-wavelength in which the AC voltage AC has the positive polarity, rectification current Irt flows along a path of the diode series circuit 20-1→load resistor RL→diode series circuit 20-3 as seen in FIG. 5A. In particular, in this instance, the rectification current Irt flows through the light emitting diodes DL which form the diode series. circuits 20-1 and 20-3. Consequently, all light emitting diodes DL which form the diode series circuits 20-1 and 20-3 emit light.

On the other hand, within a period of another half-wavelength in which the AC voltage AC has the negative polarity, the rectification current Irt flows along a path of the diode series circuit 20-2→load resistor RL→diode series circuit 20-4 as seen in FIG. 5B to cause all of the light emitting diodes DL which form the diode series circuits 20-2 and 20-4 to emit light. In other words, in the present embodiment, the rectification current Irt serves as driving current for driving the light emitting diodes DL to emit light.

In the LED driving block 1 of the present embodiment, the rectification voltage Vrt of the LED bridge circuit 10 is obtained as a voltage across the load resistor RL. Also in the present embodiment, the rectification voltage Vrt is given as a level according to the difference between the potential V1 at the positive output terminal and the potential V2 at the negative output terminal in conformity with the description given hereinabove with reference to FIGS. 1A, 1B and 2.

However, in the present embodiment, since a plurality of light emitting diodes DL are interposed in the paths along which the rectification current Irt flows, the level of the rectification voltage Vrt which is the difference between the potential V1 and the potential V2 is given as the difference of the voltage drop by the light emitting diodes from the AC voltage VAC.

As a particular example, it is assumed that the number of light emitting diodes DL which form one diode series circuit 20 is 15. Also it is assumed that the voltage drop Vf of one light emitting diode DL is Vf=3.3 V. In this instance, since the rectification current Irt flows through 30 (=15×2) light emitting diodes within each of periods in which the AC voltage AC has the positive polarity and the negative polarity, the total voltage drop level caused by conduction of the light emitting diodes within each of the periods in which the AC voltage AC is the positive polarity and the negative polarity is 3.3 V×30=99 V.

Accordingly, if it is assumed that, for example, the peak level of the AC voltage VAC supplied from the AC voltage AC is 141 Vpeak, then the rectification voltage Vrt is 141−99=42 Vpeak. This rectification voltage Vrt appears as a voltage across the load resistor RL.

Figure 6:
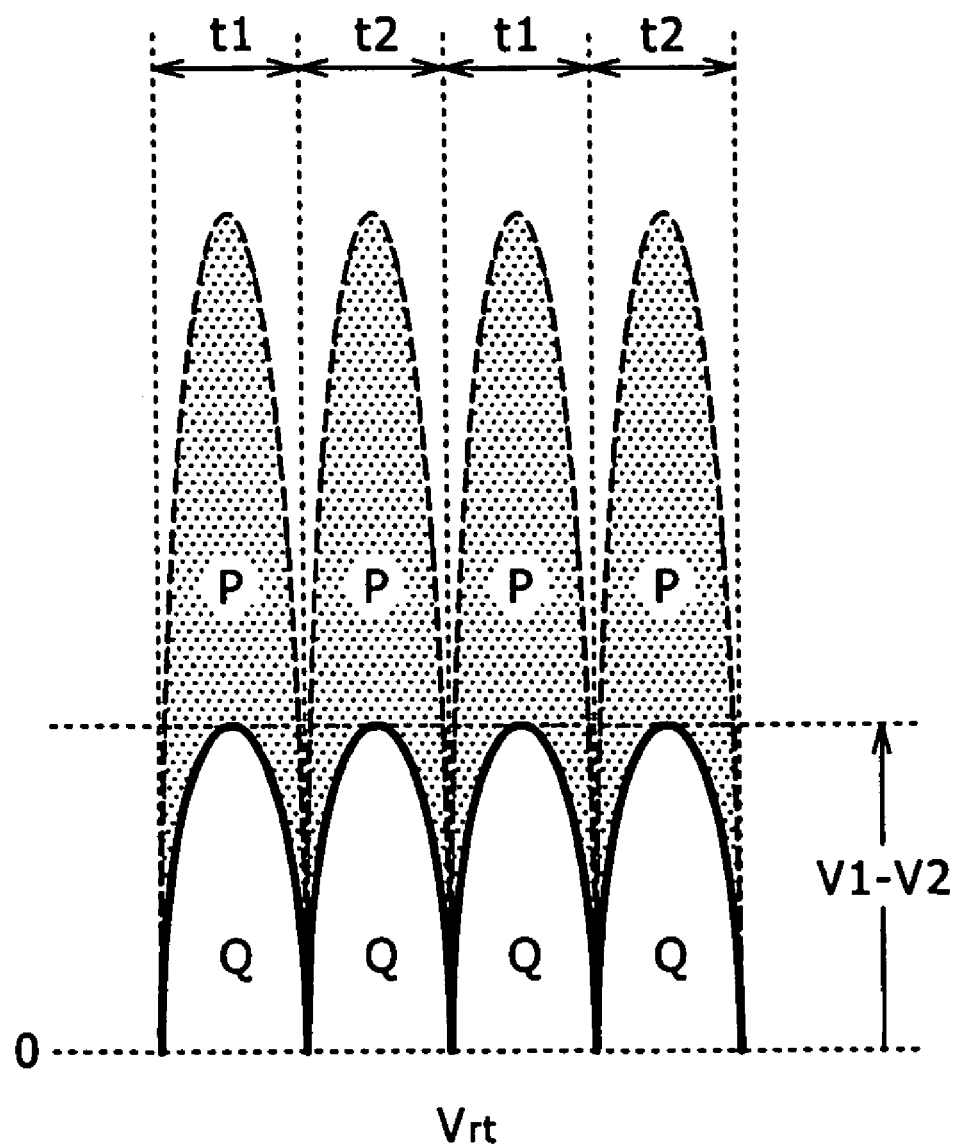
FIG. 6 is a waveform diagram schematically illustrating power consumption of the LED driving block of FIG. 4.

FIG. 6 illustrates the power supply amount as an area of a waveform of the rectification voltage Vrt. It can be considered based on the foregoing description that the power corresponding to the area P of each textured portion of the waveform of FIG. 6 is consumed by the light emitting diodes DL by a rectification operation of the LED bridge circuit 10 while the power corresponding to the area Q of the remaining blank portion is consumed by the load resistor RL.

Figure 20:
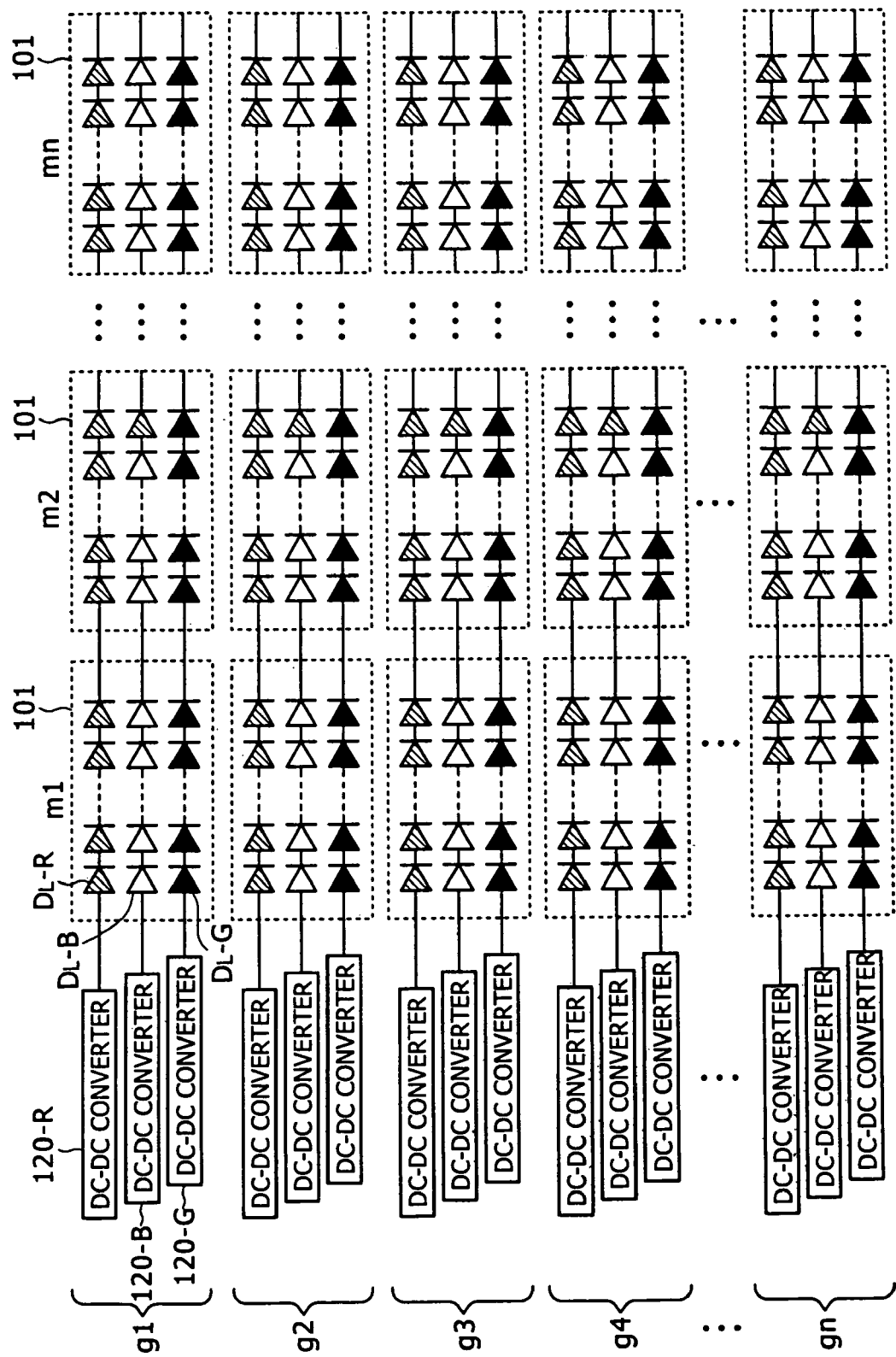
FIG. 20 is a circuit diagram showing an example of a configuration for driving light emitting diodes of the backlight panel shown in FIG. 19.

According to the configuration of the LED driving block 1 of the present embodiment described above with reference to FIGS. 4 to 6, it is possible to input, for example, the AC voltage AC directly to the LED driving block 1 to drive the light emitting diodes DL to emit light. In other words, an AC power supply is applied directly to the LED driving block 1 to drive the LED driving block 1 to emit light. This signifies that, for example, the DC-DC converter described hereinabove with reference to FIG. 20 can be eliminated in order to drive the light emitting diodes DL to emit light. Further, since the diode series circuit 20 corresponds to one LED series circuit 130 in the conventional illumination apparatus, it can be considered that the LED bridge circuit 10 can manage driving for light emission of the light emitting diodes DL corresponding to four LED series circuits 13 in the conventional illumination apparatus.

From this, the circuit scale of an apparatus wherein the LED driving block 1 of the present embodiment is used for illumination (as a light source) can be reduced significantly when compared with that of an apparatus wherein the conventional LED driving block is used. As a result, also reduction in cost, power consumption and so forth can be anticipated.

However, the AC voltage AC has a considerably low frequency, for example 50 HZ, as an alternating power supply. Therefore, where the AC voltage AC is inputted as an AC voltage as seen in FIG. 4, emission and non-emission of light of the light emitting diodes DL are repeated at comparatively slow timings corresponding to the period of the AC voltage AC. Therefore, where emission of the light of the light emitting diodes DL is examined individually, it does not look to the eyes of human beings that it constantly emits light, but looks as if it blinks periodically. However, in an illumination (light source) apparatus such as a backlight, for example, of an LCD apparatus, it is necessary for light to be emitted constantly.

However, it has been confirmed that such blinking as described above is reduced to such a degree that there is no problem depending upon a manner of arrangement of the light emitting diodes DL such as, for example, an arrangement wherein those light emitting diodes DL which emit light within a period in which the AC voltage AC has the positive polarity and those light emitting diodes DL which emit light within another period in which the AC voltage AC has the negative polarity are disposed adjacent each other. Such blinking as described above can be eliminated also by a combination of the light emitting diodes DL with a fluorescent material which can maintain emission of light.

The basic configuration of the illumination apparatus of the present embodiment is such as described above with reference to FIGS. 4 to 6. Actually, however, it is difficult under present conditions to place the circuit configuration shown in FIG. 4 as it is into practical use. The reason is described below with reference to FIGS. 7A and 7B.

FIGS. 7A and 7B illustrate a connection relationship of the diode series circuits 20-1, 20-2, 20-3 and 20-4 which form the LED bridge circuit 10 and the load resistor RL after the manner of the circuit pattern of FIG. 5 for the convenience of description with regard to the LED driving block 1 of the present embodiment. Further, it is assumed that, in FIGS. 7A and 7B, one diode series circuit 20 is formed by connecting 34 light emitting diodes DL0 to DL33 in series.

First as seen in FIG. 7A, within a period in which the AC voltage VAC has the positive polarity, the rectification current Irt flows along a path of the diode series circuit 20-1→load resistor RL→diode series circuit 20-3 but does not flow through the diode series circuits 20-2 and 20-4. Actually, however, when the rectification current Irt flows along the path described above, leak current ILEAK flows through the light emitting diodes DL, which are connected in series in the diode series circuits 20-4 and 20-2, in the opposite direction to the polarity of them. In other words, a path of the diode series circuit 20-2→load resistor RL→diode series circuit 20-4 along which the leak current ILEAK flows is formed.

The leak current amount of the light emitting diodes is comparatively high and also the dispersion in leak current amount among the devices is high. Therefore, the partial voltage of the voltage applied to the light emitting diodes DL which form the diode series circuit 20 becomes inconstant in response to the dispersion of the leak current amount described above. The light emitting diodes DL then equivalently have a resistance value which increases as the leak current decreases. In other words, to a light emitting diode DL which has lower leak current, a higher voltage is applied by the leak current.

The light emitting diodes DL0 to DL33 which form the diode series circuit 20-4 shown in FIG. 7A are equivalently indicated as resistors Rd0 to Rd33 corresponding to the respective leak current amounts in FIG. 7B. Here, it is assumed that, for example, the leak current ILEAK flows through the diode series circuit 20-4 and the resistor Rd0 has a resistance value higher than the sum total of the resistance values of the other resistors Rd1 to Rd33. Actually, this is a case wherein the amount of leak current ILEAK flowing through the light emitting diode DL0 among the light emitting diodes DL0 to DL33 is remarkably smaller than those of the other light emitting diodes DL1 to DL33. In this instance, for example, the voltage Vd0 across the resistor Rd0 is higher than the voltages Vd1 to Vd33 of the series connection of the other resistors Rd1 to Rd33. As an actual case of such a situation as just described, a situation wherein a reverse voltage lower than a withstand voltage is applied to the light emitting diodes DL1 to DL33 from among the light emitting diodes DL0 to DL33 can actually occur. It is assumed that a reverse voltage higher than a withstand voltage is applied to the light emitting diode DL0. In this instance, the light emitting diode DL0 is broken by the voltage exceeding the withstand voltage thereof.

As apparent from the description above, it is difficult to use the configuration shown in FIG. 4 as it is for illumination from the reason that the withstand voltage of the light emitting diodes is low. However, according to the description given above with reference to FIG. 7B, for example, where an element having a very low resistance value to leak current is included in the diode series circuit 20, then it is considered that the reverse voltages applied to the other elements are very low. From this, if the diode series circuit 20 is formed such that an element having a high resistance value with respect to leak current is included in the series circuit, then a state wherein a reverse voltage lower than a withstand voltage is applied to the remaining light emitting diodes DL can be obtained stably by a significant voltage drop obtained by the element having the high resistance value.

Figure 8:
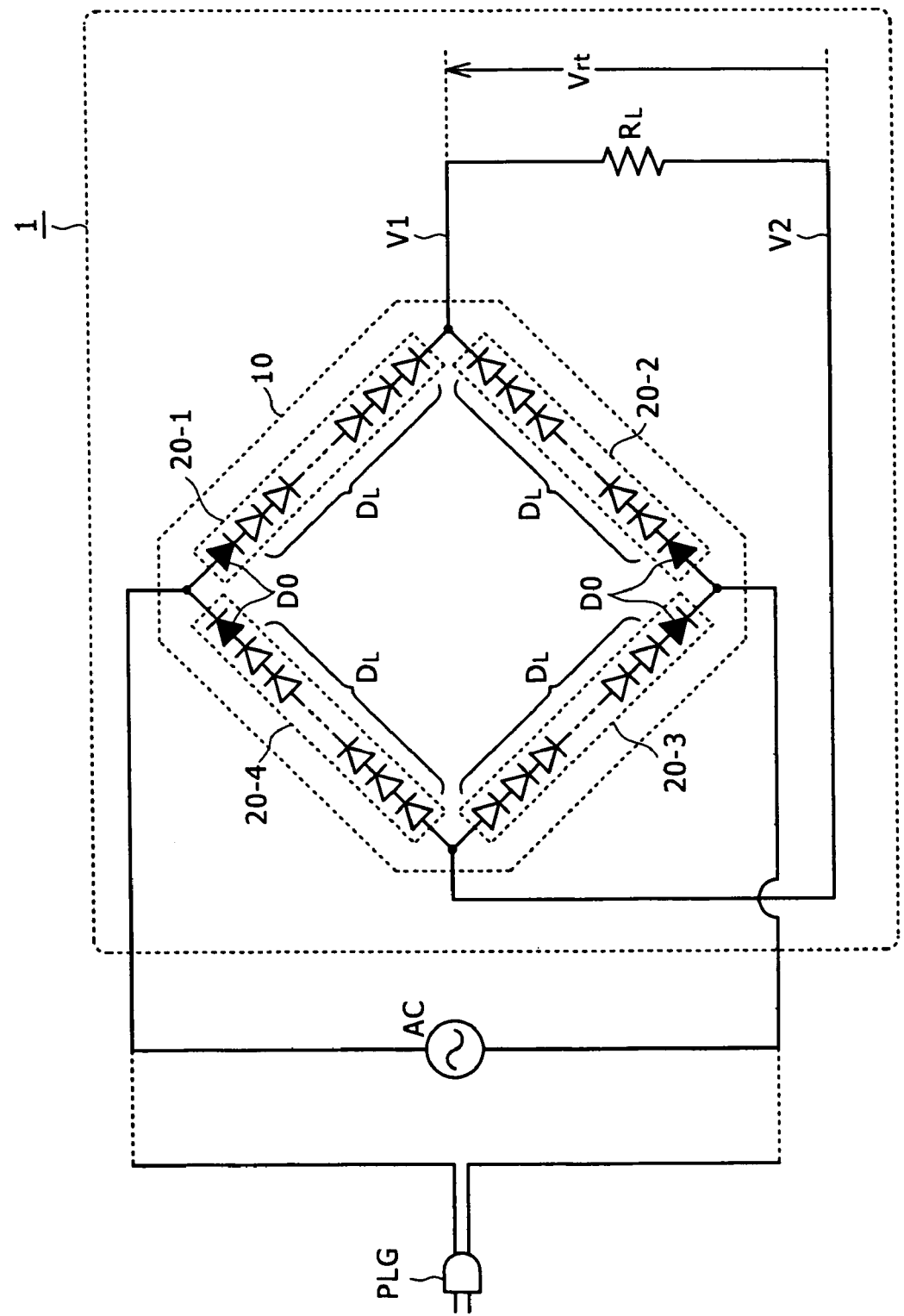
FIG. 8 is a circuit diagram showing a configuration of the LED driving block shown in FIG. 4 but in a form suitable for practical use.

Based on this, as an actual illumination apparatus of the present embodiment, the LED driving block 1 is configured in such a manner as seen in FIG. 8. Referring to FIG. 8, according to the actual illumination apparatus of the present embodiment shown, each of the diode series circuits 20 includes at least one rectifying diode D0. Here, in the diode series circuit 20-1, one rectifying diode D0 is connected with the same polarity to the anode side end of the light emitting diodes DL connected in series. Also in the diode series circuit 20-2, one rectifying diode D0 is connected with the same polarity to the anode side end of the light emitting diodes DL connected in series.

In contrast, in the diode series circuits 20-3 and 20-4, one rectifying diode D0 is connected with the same polarity to the cathode side end of the light emitting diodes DL connected in series.

In short, in the present embodiment, each diode series circuit 20 is configured such that one rectifying diode D0 is inserted to a position at which it is connected to the positive input terminal or the negative input terminal.

The rectifying diodes D0 are originally applied for rectification and do not emit light. Further, generally a rectifying diode has a very high voltage withstanding property when compared with a light emitting diode. Also the leak current amount flowing in the reverse direction is very small with the rectifying diode.

Since the rectifying diodes D0 having the nature described above are inserted, the reverse voltage Vd generated by the leak current ILEAK flowing in the reverse direction through each of the diode series circuits 20-1, 20-2, 20-3 and 20-4 is very high across the rectifying diode D0 as recognized from the description given hereinabove with reference to FIG. 7. Since a significant voltage drop of the reverse voltage by the rectifying diodes D0 occurs in this manner, the reverse voltage to be applied to each of the remaining light emitting diodes DL is reduced sufficiently to such a degree that it is lower than the withstand voltage of the light emitting diodes DL.

In short, even if the AC voltage AC is applied directly, the light emitting diodes are not broken at all by a voltage higher than the withstand voltage thereof. Thus, a sufficiently practical LED driving block 1 is obtained.

It is to be noted that the number of light emitting diodes DL included in the LED bridge circuit 10 may be set arbitrarily if it is within a maximum number which depends upon equilibrium among the level of the AC voltage inputted as driving power, the total voltage drop of the light emitting diodes DL and the load resistance. Incidentally, with emphasis on efficiency, the resistance of the load resistor RL is reduced as low as possible while a number of light emitting diodes DL as great as possible can be provided in each of the diode series circuits 20-1 to 20-4.

Further, while basically the numbers of the light emitting diodes DL and the rectifying diodes D0 are individually set equal among the diode series circuits 20-1 to 20-4, under certain circumstances, they may otherwise be different among the diode series circuits 20-1 to 20-4.

Figure 9:
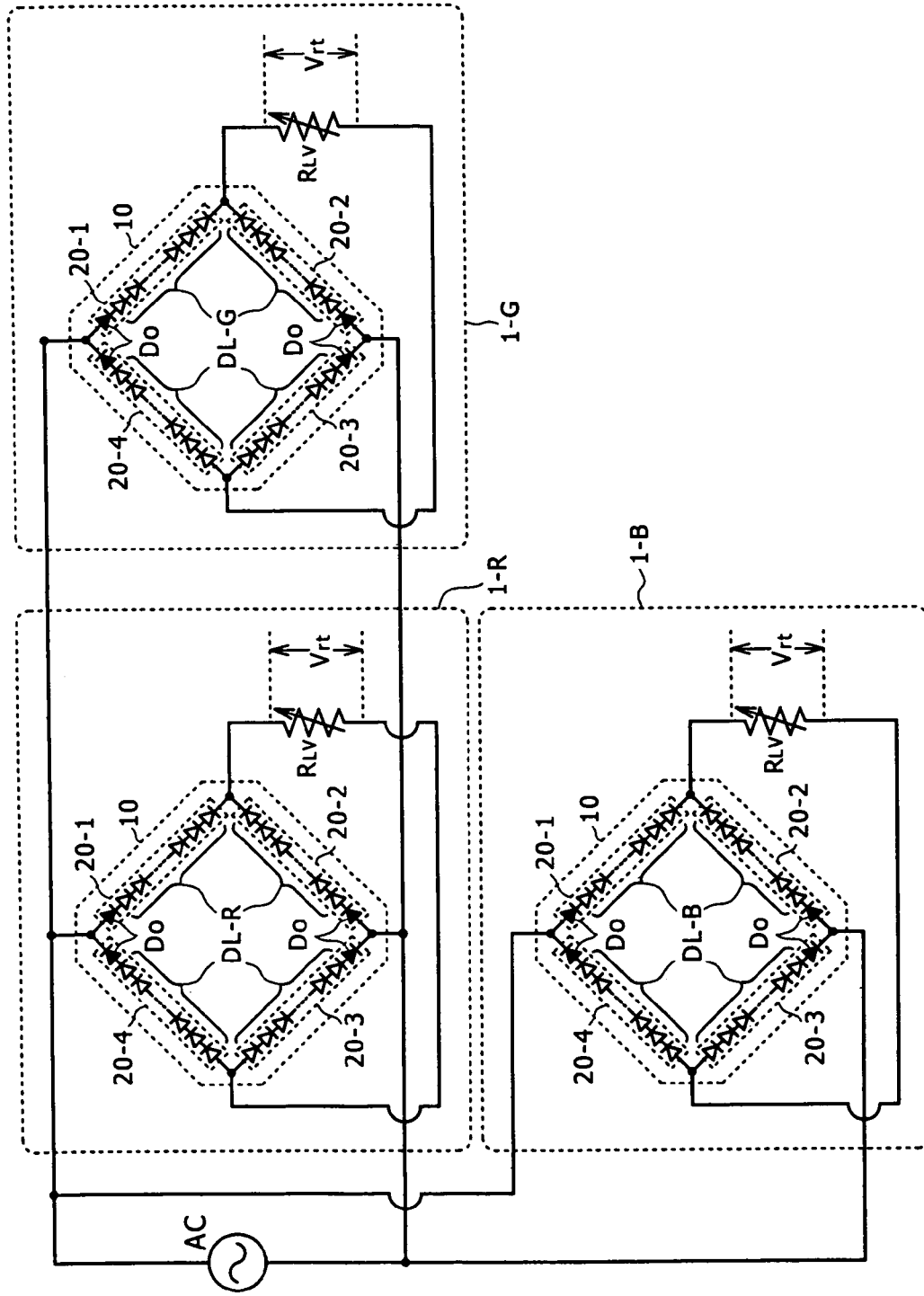
FIG. 9 is a circuit diagram showing a basic configuration of an illumination apparatus wherein the LED driving block shown in FIG. 4 is used to obtain white light.

An example of a basic structure of an illumination (light source) apparatus which uses light emitting diodes for R, G and B to obtain white light based on the LED driving block 1 having the configuration described above with reference to FIG. 8 is shown in FIG. 9.

Referring to FIG. 9, there are shown one LED driving block 1-R for red (R), one LED driving block 1-G for green (G) and one LED driving block 1-B for blue (B). The LED driving blocks 1-R, 1-G and 1-B have a basic configuration similar to that of the LED driving block 1 shown in FIG. 8. Accordingly, in all of the LED driving blocks 1-R, 1-G and 1-B, a rectifying diode DO is included in each of the diode series circuits 20-1 to 20-4.

However, in the LED driving block 1-R, only the light emitting diode DL-R for red (R) is used for the light emitting diodes connected in series in each of the diode series circuits 20-1 to 20-4. Similarly, the LED driving block 1-G includes only green light emitting diodes DL-G for green (G) and the LED driving block 1-B includes only blue light emitting diodes DL-B for blue (B). Further, a variable load resistor RLV is used as the load resistor included in each of the LED driving blocks 1-R, 1-G and 1-B.

The LED driving blocks 1-R, 1-G and 1-B formed in this manner are connected in parallel to the AC voltage AC. In other words, the LED driving blocks 1-R, 1-G and 1-B are connected such that the positive line and the negative line of the AC voltage AC are connected to the positive input terminal and the negative input terminal of the LED bridge circuit 10 in each of the LED driving blocks 1-R, 1-G and 1-B.

According to such a configuration as described above, the LED driving block 1-R receives the AC voltage AC as an input thereto and performs rectification operation by means of the LED bridge circuit 10. Consequently, the light emitting diodes DL-R for red which form the LED bridge circuit 10 are driven to emit light. Simultaneously, also in the LED driving block 1-G, the LED bridge circuit 10 performs rectification operation, whereupon the green light emitting diodes DL-G for green which form the LED bridge circuit 10 are driven to emit light. Also in the LED driving block 1-B, the LED bridge circuit 10 performs rectification operation, whereupon the blue light emitting diodes DL-B for blue which form the LED bridge circuit 10 are driven to emit light.

Since the light emitting diodes DL which correspond the colors of R, G and B are drive to emit light simultaneously in this manner, the lights of R, G and B are additively mixed to obtain white light.

Besides, in each of the LED driving blocks 1-R, 1-G and 1-B, the variable load resistor RLV is inserted as a load resistor as described hereinabove. By varying the variable load resistor RLV (varying the rectification voltage Vrt), the emitted light quantity of the light emitting diodes DL of the LED bridge circuit 10 is varied. In particular, if the resistance value of the variable load resistor RLV is decreased, then the rectification current flowing through, the LED bridge circuit 10 (that is, the driving current for the light emitting diodes DL) increases and also the emitted light quantity of the light emitting diodes DL increases. If the resistance value of the variable load resistor RLV is increased, then the rectification current flowing through the LED bridge circuit 10 decreases and also the emitted light quantity of the light emitting diodes DL decreases.

In the configuration of FIG. 9, the adjustment of the emitted light quantity of the light emitting diodes DL is performed independently for each of the LED driving blocks 1-R, 1-G and 1-B. In other words, the emitted light quantity of the light emitting diodes DL can be adjusted independently for each of the colors of R, G and B. This signifies that, in adjustment of the color tone of white light or the like, the light quantity adjustment is possible for each of the color lights of R, G and B from which white light is to be formed. For the adjustment of the color tone of white light and so forth, it is efficient to adjust the light quantity for each of the colors of R, G and B. Taking this into consideration, also the illumination apparatus of the present embodiment is configured such that the load resistor in each of the LED driving blocks 1-R, 1-G and 1-B is formed so as to function as a variable resistor so that the light quantity adjustment can be performed independently for each of the colors of R, G and B.

It is to be noted that the configuration shown in FIG. 9 is a basic configuration at all which makes a minimum unit in the illumination apparatus of the present embodiment which uses light emitting diodes for R, G and B to obtain white light. For example, if the number of light emitting diodes for each of R, G and B necessary to form an illumination apparatus which can be used actually cannot be assured using one LED driving block 1, then the LED driving blocks 1-R, 1-G and 1-B may be added suitably as occasion demands. Also the LED driving units 1 to be added in this instance may each be provided such that the positive input terminal and the negative input terminal of the LED bridge circuit 10 are connected to the positive line and the negative line of the AC voltage AC, respectively, in a connection scheme similar to that of FIG. 9.

Further, the numbers of the LED driving blocks 1-R, 1-G and 1-B to be provided in the illumination apparatus need not necessary be equal to each other. For example, the numbers of the LED driving blocks 1-R, 1-G and 1-B may be different from each other depending upon a difference among light emission efficiencies with regard to R, G and B. Further, the numbers of the light emitting diodes DL and the rectifying diodes D0 provided in the LED bridge circuit 10 may be different between a plurality of LED driving blocks 1.

Figure 10:
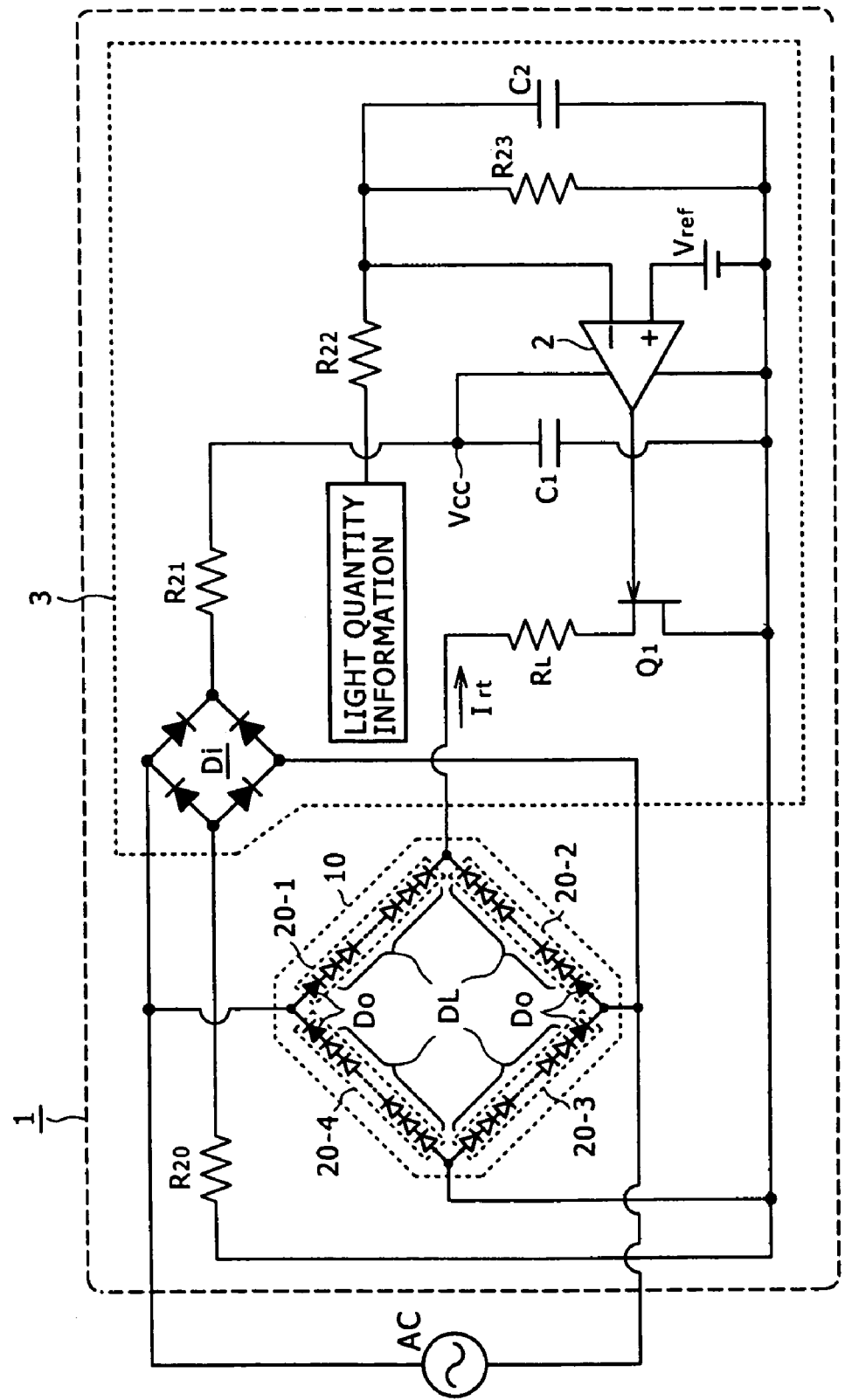
FIG. 10 is a circuit diagram showing an example of a configuration of the LED driving block of FIG. 4 which additionally includes a driving current control circuit.

FIG. 10 shows a more practical configuration with regard to a technical concept where the load resistor is formed as a variable resistor for adjustment of the light quantity in the illumination apparatus shown in FIG. 9. Referring to FIG. 10, there is shown a circuit diagram wherein one LED driving block 1 is connected to the AC voltage AC for the convenience of illustration and description. It is to be noted that actually the LED driving block 1 having a configuration shown in FIG. 10 is provided for each of R, G and B as seen from FIG. 9.

The LED driving block 1 shown in FIG. 10 includes a driving current control circuit 3. The driving current control circuit 3 includes a bridge rectification circuit Di formed from four ordinary rectification diodes connected in a bridge connection. The positive input terminal and the negative input terminal of the bridge rectification circuit Di are connected to the positive line and the negative line of the AC voltage AC. Further, the positive output terminal of the bridge rectification circuit Di is connected to the negative input terminal of the LED bridge circuit 10 through a resistor R21 and a capacitor C1. The negative output terminal of the bridge rectification circuit Di is connected to the negative input terminal of the LED bridge circuit 10 through a resistor R20. Since the bridge rectification circuit Di is connected in this manner, it receives the AC voltage AC as an input thereto and rectifies the AC voltage AC. The rectification output of the bridge rectification circuit Di is smoothed by the capacitor C1, and a DC voltage Vcc is obtained as a voltage across the capacitor C1. The DC voltage Vcc in this instance has a level of the difference of a voltage drop by the resistors R20 and R21 from the level of the AC voltage AC. The DC voltage Vcc is connected to the positive power supply of an operational amplifier 2. The negative power supply of the operational amplifier 2 is connected to the negative output terminal (ground potential) of the LED bridge circuit 10.

A voltage obtained by dividing a voltage value as light quantity information by means of resistors R22 and R23 is inputted to the negated input terminal of the operational amplifier 2. It is to be noted that the light quantity information can be obtained from a photosensor or the like provided so as to detect the emitted light quantity of the light emitting diodes DL provided in the same LED driving block 1. A reference voltage Vref is inputted to the non-negated input terminal of the operational amplifier 2. In this instance, a time constant capacitor C21 for adjustment of the sensitivity of the driving current control circuit 3 is connected in parallel to the resistor R23.

The output of the operational amplifier 2 is connected to the gate of a transistor Q1 interposed between the load resistor RL and the negative output terminal of the LED bridge circuit 10.

In the driving current control circuit 3 formed in such a manner as described above, the operational amplifier 2 compares the voltage value as the light quantity information with the reference voltage Vref and applies a voltage level based on the difference to the gate of the transistor Q1. The transistor Q1 varies the amount of current to flow between the drain and the source thereof in response to the application of the gate voltage. In other words, the transistor Q1 varies the level of the rectification current Irt flowing through the LED bridge circuit 10 (driving current for the light emitting diodes DL). In particular, control equivalent to the variation of the resistance value (RLV) of the load resistor in FIG. 9 is performed, and consequently, the emitted light quantity of the light emitting diodes DL is variably controlled.

In such a configuration of the control loop as described above, if a value corresponding to a required emitted light quantity set in advance for the light emitting diodes DL in the same LED driving block 1 is set to the reference voltage Vref to be inputted by the operational amplifier 2, then the emitted light quantity of the light emitting diodes DL is controlled by operation of the driving current control circuit 3 so that the required emitted light quantity may be obtained. For example, if the LED driving blocks 1-R, 1-G and 1-B shown in FIG. 9 are formed with the configuration shown in FIG. 10 and the reference voltage Vref of the operational amplifier 2 in each of the LED driving blocks 1-R, 1-G and 1-B is set in response to the emitted light quantity for each of the colors of R, G and B determined in order to obtain required white light, then light quantity control of the light emitting diodes DL-R, DL-G and DL-B is performed for each of the LED driving blocks 1-R, 1-G and 1-B so that optimum white light may always be obtained.

Incidentally, a control method called conduction angle control or phase control is known as a variable control system for the AC power. A configuration for the conduction angle control is described with reference to FIG. 11.

Figure 11:
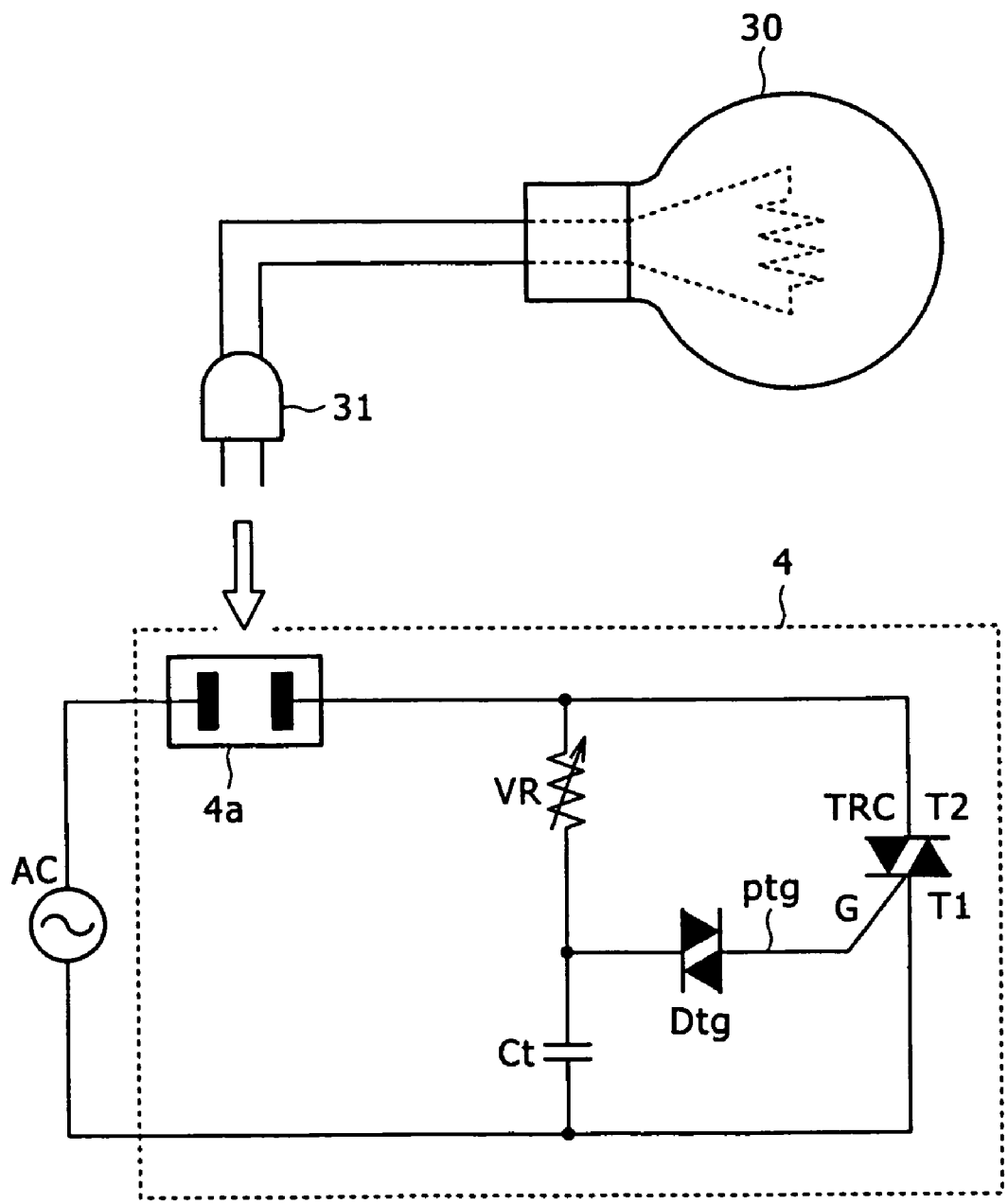
FIG. 11 is a circuit diagram showing a configuration of a popular conduction angle control circuit.

Referring to FIG. 11, a conduction angle control circuit 4 is shown as a circuit section which performs the conduction angle control. For the simplified illustration and description, an example wherein an incandescent lamp is used as a load to which AC power is to be supplied. As well known in the art, the AC power control by the conduction angle control is effective generally for resistive loads in addition to an incandescent lamp.

The conduction angle control circuit 4 in this instance includes an AC socket 4a inserted in one of lines of the opposite polarities (in FIG. 11, in a line of the positive polarity) of the AC voltage AC. If an AC plug connected to a filament of the incandescent lamp 30 is inserted into the AC socket 4a, then the filament of the incandescent lamp 30 is inserted as a load into the line of the AC voltage AC.

A series circuit of a variable resistor VR and a time constant capacitor Ct is connected between the positive line of the AC voltage AC in which the AC socket 4a (load) is inserted and the negative line of the AC voltage AC. The node between the variable resistor VR and the time constant capacitor Ct is connected to the gate (G) of a triac TRC through a trigger diode Dtg. The triac TRC is connected at a terminal T1 thereof to the negative line of the AC voltage AC. The triac TRC is connected at another terminal T2 thereof to the positive line of the AC voltage AC through the AC socket 4a (load).

If a positive or negative trigger pulse ptg is applied to the gate (G) of the triac TRC, then the triac TRC is turned from an off state into an on state between the terminals T1 and T2 thereof. After the triac TRC is turned on between the terminals T1 and T2 thereof, the AC voltage AC is supplied to the load (filament of the incandescent lamp 30) connected to the AC socket 4a.

At this time, the AC voltage AC, that is, an AC voltage, is applied between the terminals T1 and T2 of the triac TRC. While the AC voltage exhibits a zero cross at 0°, 180° and 360° within one period, every time the voltage difference between the terminals T1 and T2 of the triac TRC becomes equal to 0 volt in response to the zero cross state, the triac TRC which has been in an on state turns off. Thereafter, the triac TRC maintains the off state until after a trigger pulse ptg is applied to the gate (G) thereof.

In this instance, the trigger pulse is outputted from the trigger diode Dtg. The trigger diode Dtg is a device through which break-over current in the form of a pulse flows when a potential difference higher than a break-over voltage which depends upon the type of the trigger diode Dtg is applied between the terminals thereof as well known in the art. Further, the trigger diode Dtg is a bipolar device with which such operation as described above is obtained in response to an AC waveform. Where one terminal of the trigger diode Dtg is connected to the gate (G) of the triac TRC in such a manner as seen in FIG. 11, an output of the triac TRC based on such break-over current in the form of a pulse as described above is applied as the trigger pulse ptg to the gate (G) of the triac TRC.

Then, the time constant circuit formed from the series connection of the variable resistor VR and the time constant capacitor Ct functions as a circuit which varies the timing at which a potential difference higher than the break-over voltage is to be applied to the trigger diode Dtg.

Another terminal of the trigger diode Dtg is connected to the node between the variable resistor VR and the time constant capacitor Ct. Therefore, as the AC voltage which is applied to the trigger diode Dtg, the phase of the AC voltage AC is shifted in response to the time constant of the time constant circuit (VR, Ct). Further, the resistance value of the variable resistor VR is varied to vary the time constant of the time constant circuit thereby to vary the phase shift amount of the AC voltage to be applied to the trigger diode Dtg with respect to the AC voltage AC. In response to the variation of the phase shift amount, also the timing at which the trigger pulse ptg is to be outputted from the trigger diode Dtg is varied with respect to the periodical timing of the AC voltage AC.

FIGS. 12(a) to 12(d) schematically illustrate power control of the AC power supply in response to the output timing of the trigger pulse ptg. In FIGS. 12(a) to 12(d), sine waveforms for one period of the AC voltage AC are shown. In any of the sine waveforms, a region indicated by slanting lines represents a state wherein the triac TRC is on between the terminals T1 and T2 thereof. Further, the area of any region indicated by slanting lines indicates the power amount to be supplied to the load as a ratio within one period.

FIG. 12(a) illustrates a state wherein the triac TRC is steadily on between the terminals T1 and T2 thereof within one period of the AC voltage AC. In this instance, it can be considered that the power of the AC voltage AC is applied by 100% to the load. Though not shown in FIG. 12(a), the trigger pulse ptg in this instance is outputted at zero-cross timings, for example, corresponding to 0° (360°) and 180° of the sine waveform.

It is assumed here that, in the state illustrated in FIG. 12(a), the resistance value of the variable resistor VR of the time constant circuit (VR, Ct) is varied to delay the output timings of the trigger pulse ptg by a certain fixed amount from the zero-cross timings of the AC voltage AC.

In other words, it is assumed that the output timing of the trigger pulse ptg is delayed stepwise from 0° (and 180°) as seen as the trigger pulse ptg in FIGS. 12(b), 12(c) and 12(d).

As described hereinabove, after the triac TRC turns on at a timing at which the trigger pulse ptg is applied, it turns off at a timing at which the potential difference between the terminals T1 and T2 becomes subsequently equal to 0 (that is, a zero-cross timing of the AC voltage AC). Therefore, as the output timing of the trigger pulse ptg is successively delayed from 0° (and 180°), also the period within which the triac TRC exhibits an on state between the terminals T1 and T2 thereof to supply power to the load decreases as seen in FIGS.

Figure 12:
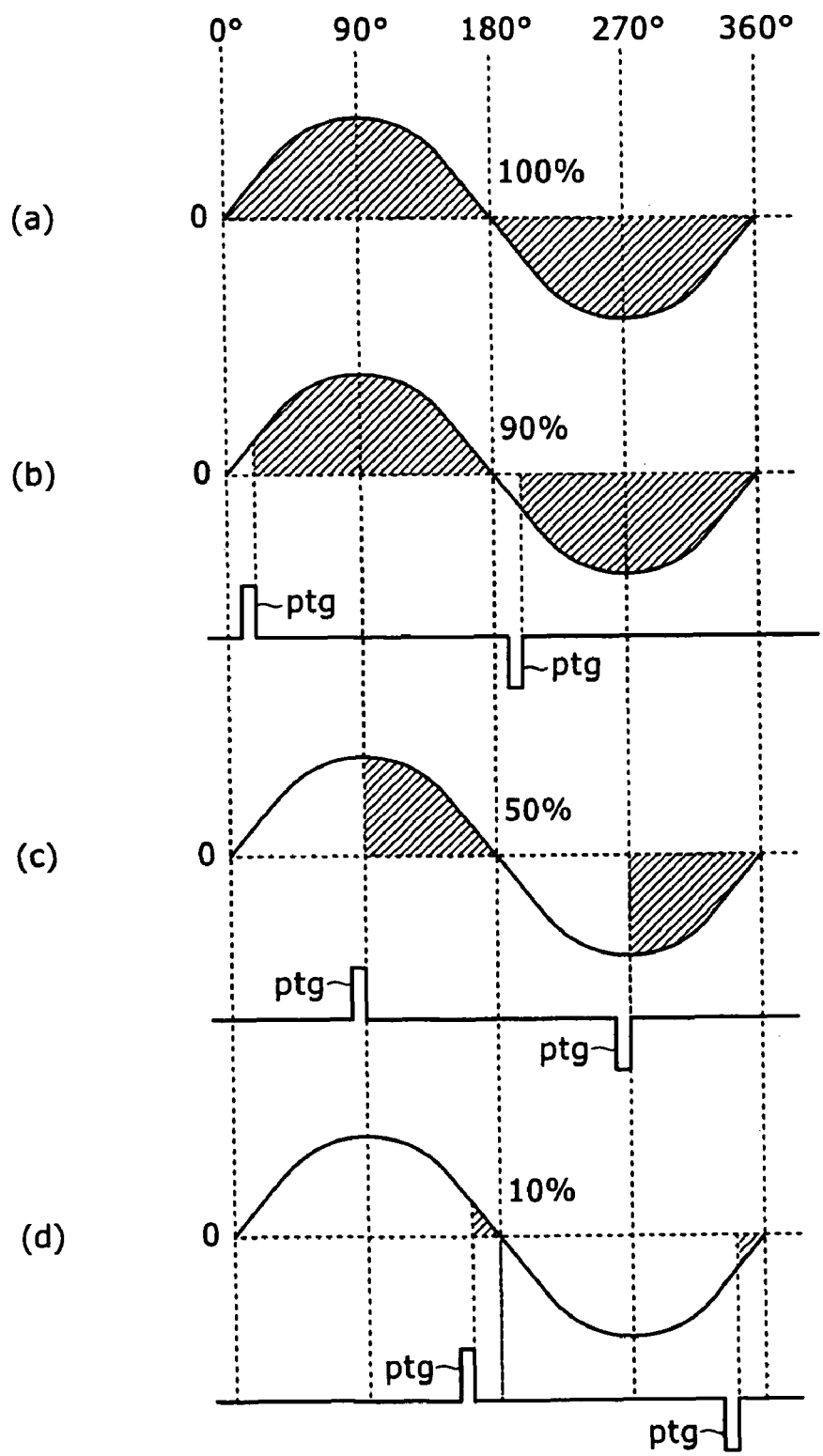
FIGS. 12($a$) to 12($d$) are waveform diagrams illustrating AC power control by the conduction angle control circuit shown in FIG. 11.

12(*a*), 12(*b*) and 12(*c*). It can be seen that, with the decrease of the supply power, also the AC power amount to be supplied to the load within one period of the AC voltage AC decreases. Incidentally, FIGS. 12(*b*), 12(*c*) and 12(*d*) illustrate the power control where the supply amount of the AC power is 90%, 50% and 10%, respectively. When the supply amount of the AC power is 50% as illustrated in FIG. 12(*c*), the trigger pulse ptg is outputted just at the output timing of 90° (or 270°). In response to this, the power supply period to the load (on period between the terminals T1 and T2) is the period from 90° to 180° (and 270° to 360°).

Further, if the conduction angle control states illustrated in FIGS. 12(*a*), 12(*b*), 12(*c*) and 12(*d*) are applied to the configuration shown in FIG. 11, then the incandescent lamp 30 exhibits a maximum light emission quantity and emits light most brightly in the control state of FIG. 12(*a*). Then, as the power supply amount decreases in order of the control states of FIGS. 12(*b*), 12(*c*) and 12(*d*), also the emitted light quantity of the incandescent lamp 30 decreases and also the brightness decreases.

Also the LED driving block 1 of the present embodiment receives supply of AC power and drives the light emitting diodes DL to emit light. Accordingly, it can be considered that, since the configuration of the conduction angle control circuit 4 shown in FIG. 11 is provided, the emitted light quantity of the light emitting diodes DL can be controlled by the AC power control.

Figure 13:
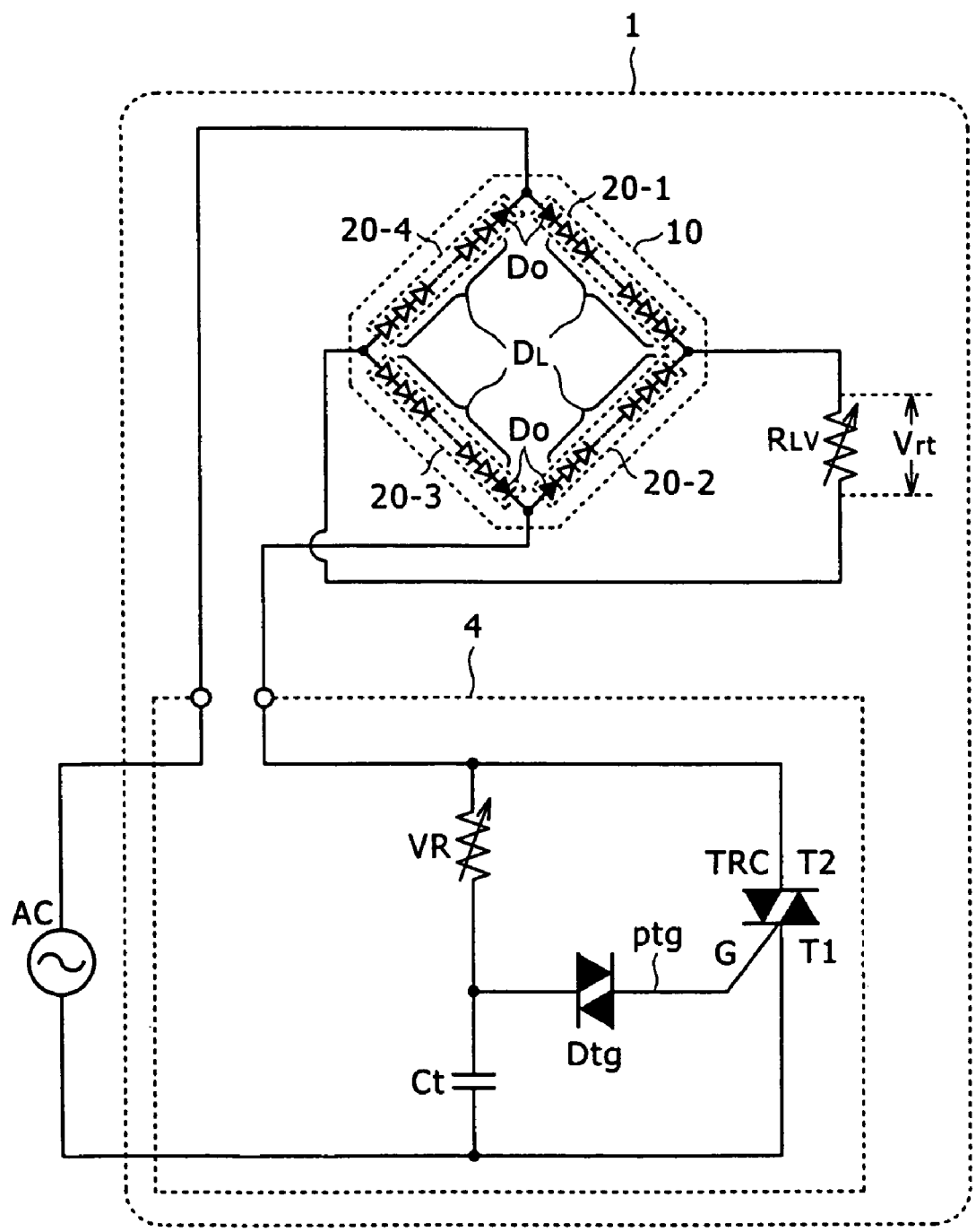
FIG. 13 is a circuit diagram showing an example of a configuration of the LED driving block of FIG. 4 which additionally includes a conduction angle control circuit.

FIG. 13 shows a circuit configuration where the configuration of the conduction angle control circuit 4 shown in FIG. 11 is provided in the LED driving block 1 of the present embodiment. For example, the LED driving block 1 shown in FIG. 13 includes the conduction angle control circuit 4 having a configuration same as that shown in FIG. 4 and connected to the AC voltage AC. Further, the positive input terminal and the negative input terminal of the LED bridge circuit 10 are connected to the location of the AC socket 4*a* which is shown as a location into which the AC plug 31 is to be inserted in FIG. 11. Consequently, conduction angle control of the LED driving block 1 can be performed by the conduction angle control circuit 4 using the circuit which is formed from the LED bridge circuit 10 and the variable load resistor RLV as a load.

Where such a configuration as shown in FIG. 13 is applied, by varying the resistance value of the variable resistor VR of the conduction angle control circuit 4, the AC power amount to be supplied to the circuit section including the LED bridge circuit 10 and the variable load resistor RLV and serving as a load varies in accordance with the principle described hereinabove with reference to FIGS. 12(*a*) to 12(*d*). As a result, the emitted light quantity of the light emitting diodes DL which form the LED bridge circuit 10 is varied.

Further, in the configuration shown in FIG. 13, since the variable load resistor RLV is used as the load resistor in accordance with the configuration of FIG. 9, also the emitted light quantity control of the light emitting diodes DL by variation of the load resistor RLV can be performed simultaneously. It is to be noted that actually the driving current control circuit 3 shown in FIG. 10 may be provided in place of the variable load resistor RLV.

Figure 14:
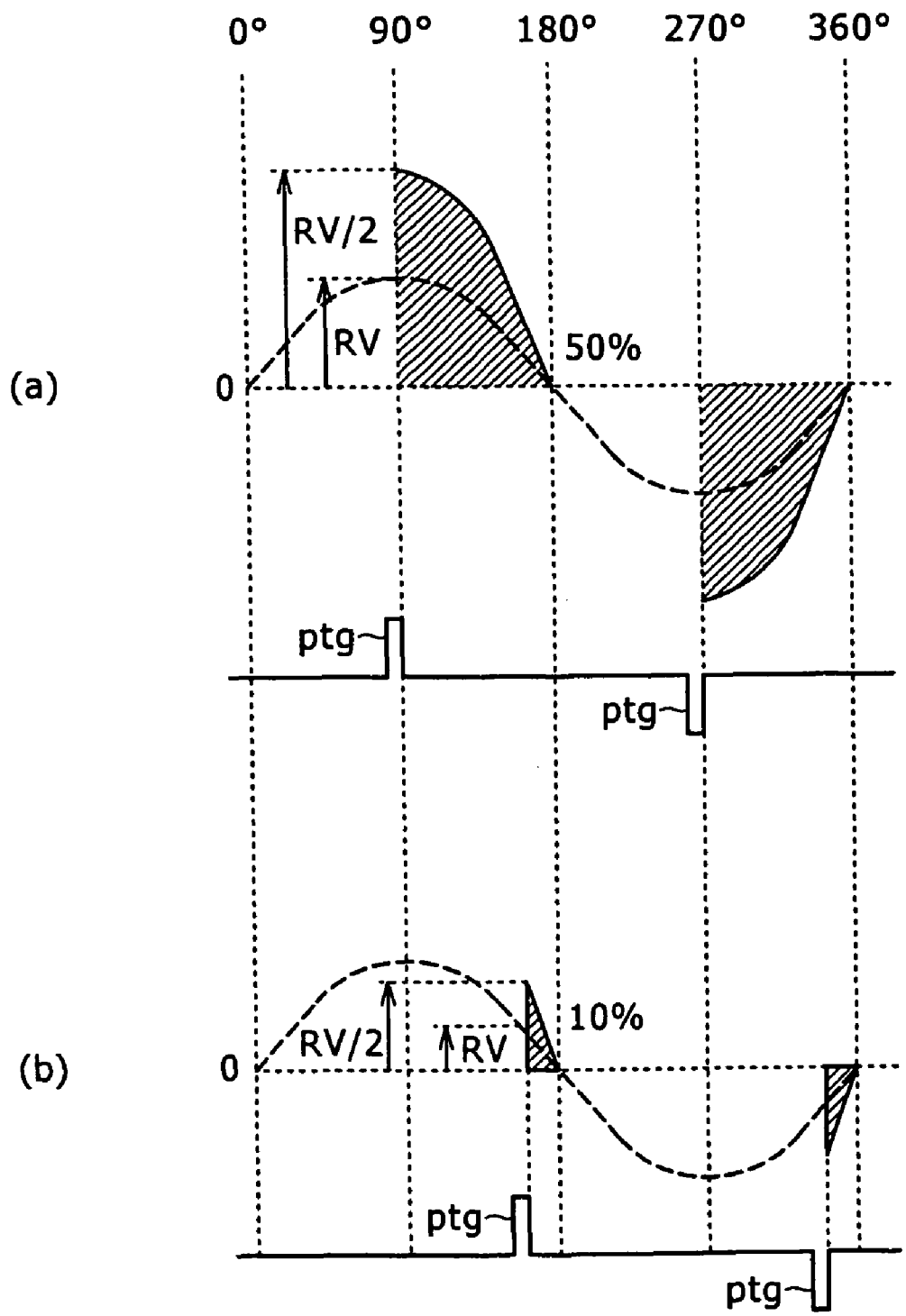
FIGS. 14(a) and 14(b) are waveform diagrams illustrating emitted light quantity control of the LED driving block of FIG. 4 where both of driving current control and conduction angle control are used.

FIGS. 14(*a*) and 14(*b*) schematically illustrate states of power supply in a case where both of the variation of the variable load resistor RLV and the AC power control by the conduction angle control circuit 4 performed by the LED driving block 1 of FIG. 13 are used in a similar manner as in FIGS. 12(*a*) to 12(*d*).

FIGS. 14(*a*) and 14(*b*) illustrate the power supply states of 50% and 10% by the AC power supply control by the conduction angle control circuit 4, respectively. Here, a certain reference value for the resistance value of the variable load resistor RLV is represented by RV. Where the reference value RV is set as the resistance value of the variable load resistor RLV, power supply corresponding to a region of a sine waveform indicated by a broken line in each of FIGS. 14(*a*) and 14(*b*) is performed. However, for example, if the resistance value of the variable load resistor RLV is decreased from the reference value RV, then the rectification current Irt increases in response to the decrease of the resistance value of the variable load resistor RLV and the power amount to be consumed by the diode series circuit 20 increases. From FIGS. 14(*a*) and 14(*b*), it can be recognized that, if the resistance value of the variable load resistor RLV is set to ½ the reference value RV, then the supply power amount per unit time increases to substantially twice. At this time, also the emitted light quantity of the light emitting diodes DL increases in response to the supply power amount.

In this manner, the LED driving block 1 of the present embodiment can perform, as light quantity control of the light emitting diodes DL, control having two degrees of freedom including variation of the driving current amount by the variation of the load resistor RL (RLV) and power amount control by conduction angle control. Consequently, for example, adjustment for obtaining an emitted light quantity necessary for each LED driving block 1 is facilitated.

Figure 21:
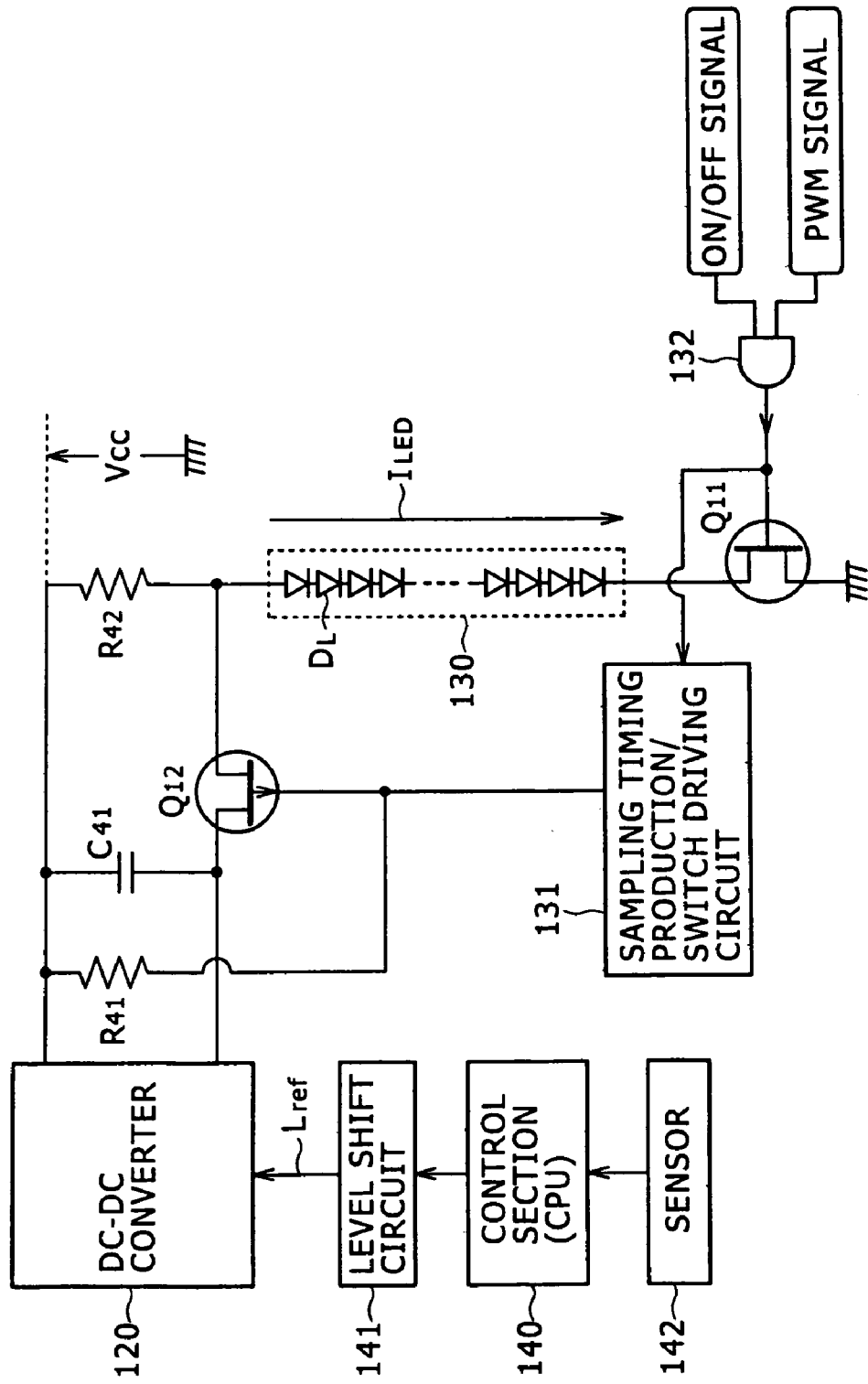
FIG. 21 is a circuit diagram showing a conventional configuration for emitted light quantity control of light emitting diodes.

Further, for example, the conventional illumination apparatus has a configuration that a DC voltage is produced by a DC-DC converter to obtain constant current and then the light quantity is adjusted by PWM control as described hereinabove with reference to FIG. 21. In other words, a DC-DC converter is required also for the light quantity control. In contrast, in the present embodiment, light quantity control by conduction angle control is performed in place of the control of the pulse width. According to the conduction angle control, the waveform of alternating current is controlled as an object of control. Accordingly, control on the primary side is possible as seen also from FIG. 13. Also variation of the rectification current Irt by variation of the load resistor basically varies the value of the load resistor RL on the primary side, and also the configuration for performing control equivalent to the variation of the load resistor RL can be formed from a small number of parts like the driving current control circuit 3 of FIG. 10. From this, according to the present embodiment, even if the configuration for controlling the emitted light quantity of the light emitting diodes DL is added, the circuit scale is reduced significantly when compared with that where a DC-DC converter is provided. Since a DC-DC converter includes parts having a large size and a heavy weight beginning with a transformer, the effects of reduction in size and weight and reduction in cost of an actual circuit are significant. Further, since light quantity control of the light emitting diodes DL is performed substantially directly on the primary side, also the loss in power conversion is reduced.

It is to be noted that the conduction angle control circuit may be configured such that the output timing of the trigger pulse ptg is controlled by a control section (CPU: microcomputer). A configuration of a conduction angle control circuit 4A corresponding to this is shown in FIG. 15.

Figure 15:
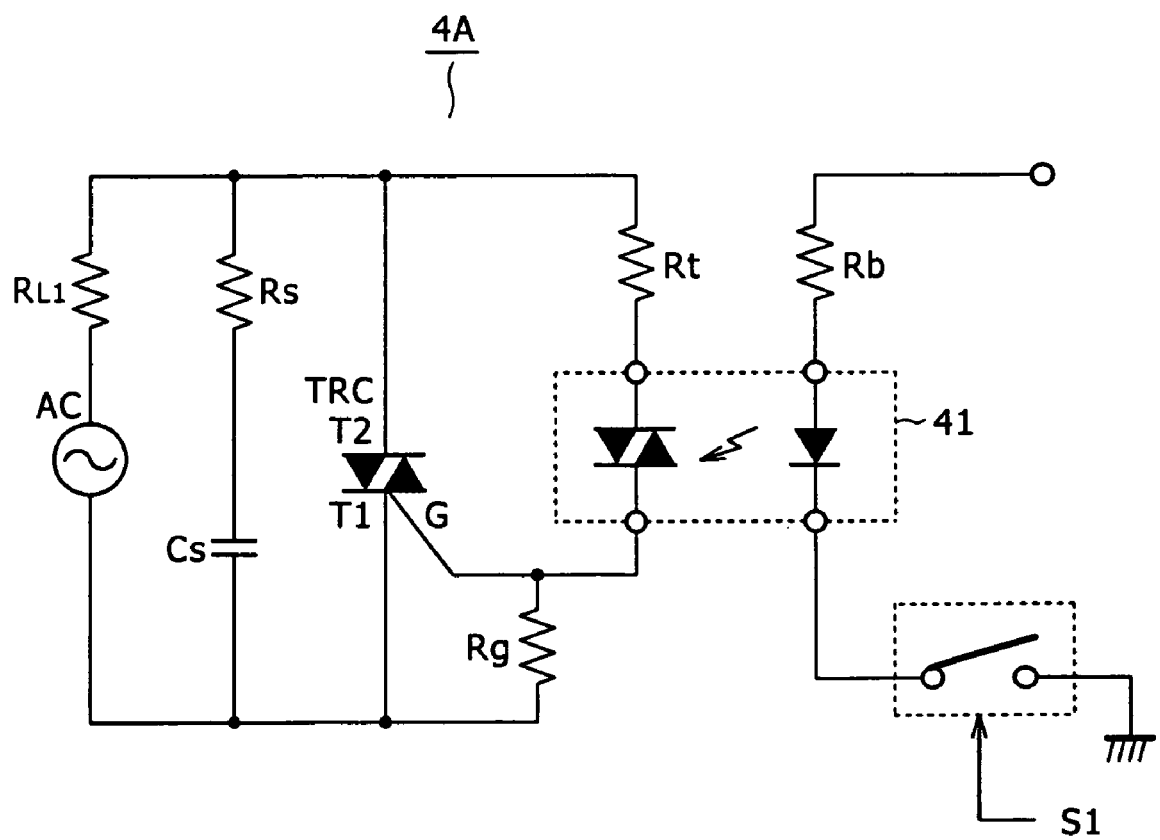
FIG. 15 is a circuit diagram showing another example of a configuration of a conduction angle control circuit.

Referring to FIG. 15, in the conduction angle control circuit 4A shown, a resistor RL1 is connected in a line of one of the polarities of the AC voltage AC (in FIG. 15, in the positive line). In the case of the LED driving block 1 of the present embodiment, the resistor RL1 indicates a load which makes an object of supply of power, and in the case of FIG. 13, a rectification circuit system formed from the LED bridge circuit 10 and the load resistor RL (RLV) is connected in place of the resistor RL1.

Further, a series connection circuit of a resistor Rs and a capacitor CS is inserted between the positive line of the AC voltage AC through the resistor RL1 and the negative line of the AC voltage AC. Further, a triac TRC is connected at a terminal T2 thereof to the positive line of the AC voltage AC through the resistor RL1 and at another terminal T1 thereof to the negative line of the AC voltage AC.

Further, a phototriac of a phototriac coupler 41 is connected at one end thereof to the resistor RL1 through a resistor Rt and at the other end thereof to the negative line of the AC voltage AC through a resistor Rg. The gate (G) of the triac TRC is connected to a node between the phototriac and the resistor Rg.

The photo-diode of the phototriac coupler 41 is connected at the anode thereof to a DC power supply of a predetermined level through a resistor Rb and at the cathode thereof to the ground through a switch SW. The switch SW is controlled between on and off by a switch on/off control signal S1 outputted from a control section not shown.

For example, the control section performs a predetermined process such as shaping of the waveform of the AC voltage AC to detect a zero-cross timing. Then, the control sections controls the switch SW on/off at a timing corresponding to the trigger pulse ptg in response to a required power amount with reference to the detected zero-cross timing. Consequently, in the phototriac coupler 41, a pulse-like signal is transmitted from the photodiode to the phototriac so that the phototriac is rendered conductive in a pulse-like fashion. At this timing, the trigger pulse ptg is applied to the gate of the triac TRC. The triac TRC to which the trigger pulse ptg is applied operates in such a manner as described hereinabove with reference to FIGS. 12(*a*) to 12(*d*). In this manner, according to the configuration shown in FIG. 15, control of the AC power supply amount is performed by the control section. Therefore, this configuration can be adopted in such a case that, for example, it is difficult for the time constant circuit (VR, Ct) of the conduction angle control circuit 4 of FIG. 13 to satisfy a required accuracy for the output timing of the trigger pulse ptg.

Figure 16:
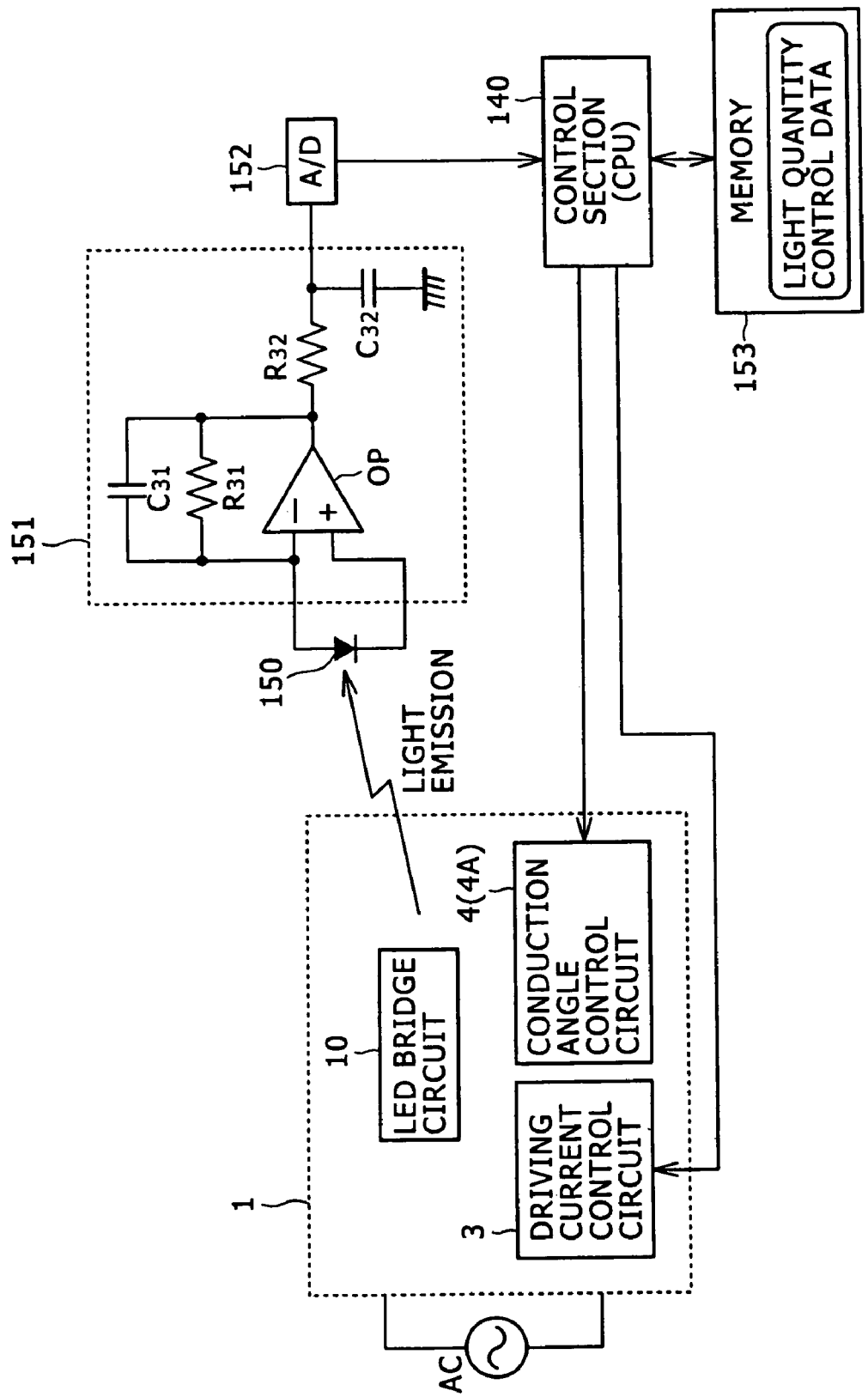
FIG. 16 is a circuit diagram showing a configuration of a control loop for controlling the emitted light quantity of light emitting diodes in the LED driving block of FIG. 4.

FIG. 16 shows an example of a configuration of a control loop for light quantity control of light emitting diodes applicable to the LED driving block 1 of the present embodiment.

In this instance, the emitted light quantity of the light emitting diodes DL provided in the LED bridge circuit 10 is detected as electric current by the photosensor 150, and current to voltage conversion is performed for the current by an I-V amplifier 151. Further, the resulting voltage is converted into a digital value by an A/D converter 152 and outputted as such to the control section 140.

The control section 140 obtains a control value for controlling the driving current control circuit 3 and another control value for controlling the conduction angle control circuit 4 based on a voltage value as light quantity information inputted thereto and light quantity control data stored in the memory 153. Then, the control section 140 controls the driving current control circuit 3 and the conduction angle control circuit 4 based on the control values. The control of the driving current control circuit 3 is, for example, variation of the reference voltage Vref to be inputted to the operational amplifier 2. Further, as control of the conduction angle control circuit 4, the resistance value of the variable resistor VR is variably controlled to change the time constant of the time constant circuit (VR, Ct). Or, the configuration of the conduction angle control circuit 4A shown in FIG. 15 may be adopted to control the on/off timings of the switch SW.

Consequently, the emitted light quantity control of the light emitting diodes DL of the LED driving block 1 is controlled so that it may always be appropriate.

Figure 22:
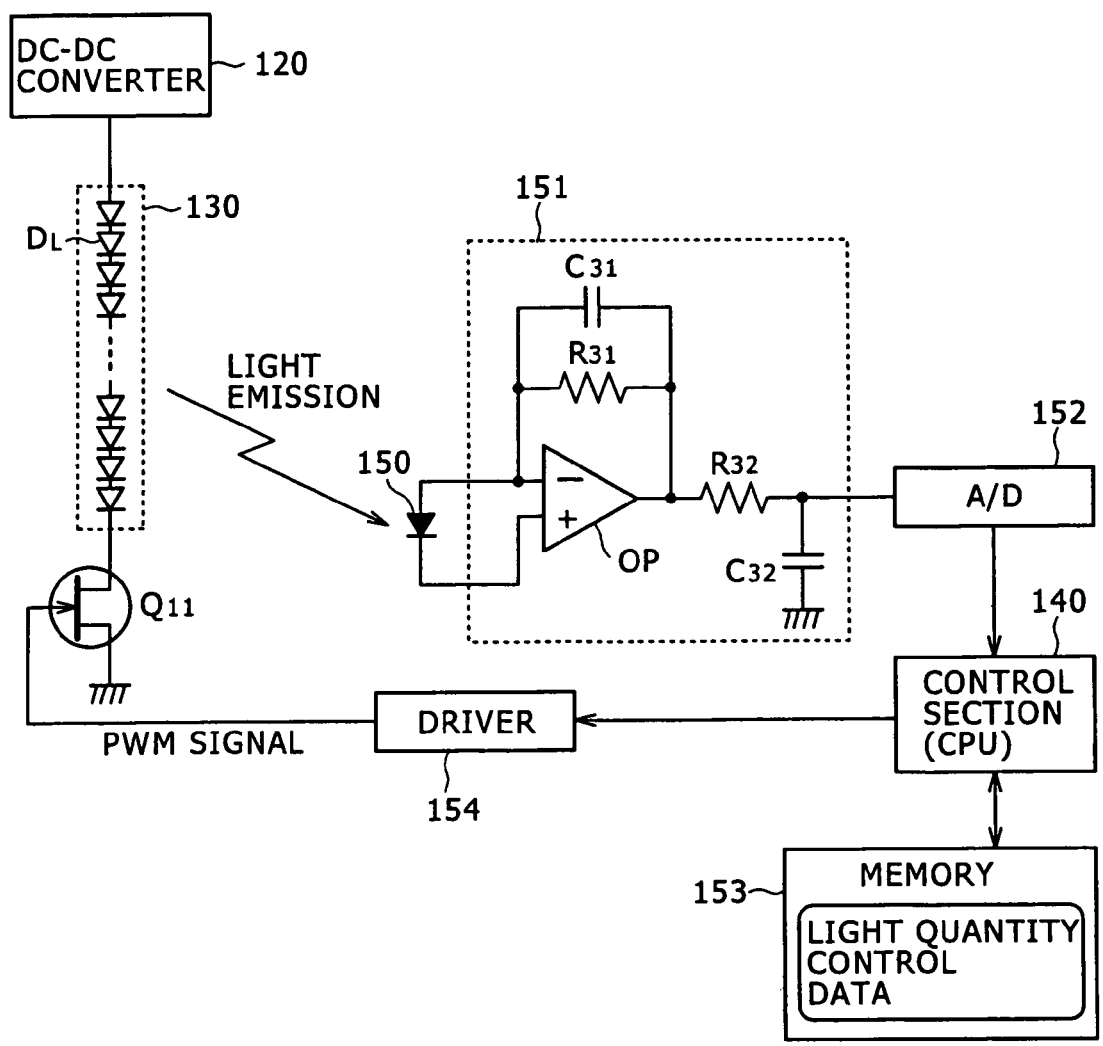
FIG. 22 is a circuit diagram showing a conventional configuration of an emitted light quantity control loop for light emitting diodes.

As described hereinabove, according to the conventional illumination apparatus, such light emission control of the light emitting diodes DL described hereinabove with reference to FIGS. 21 and 22 involves conversion into constant current by means of a DC-DC converter and application of PWM control.

In contrast, in the present embodiment, emitted light quantity control of the light emitting diodes DL can be performed by driving current control and conduction angle control on the primary side. The control section should only control parameters for the driving current control and the conduction angle control.

In the foregoing description, it is described that the LED driving block 1 of the present embodiment operates with the AC voltage inputted thereto. However, it is otherwise possible to input alternating current other than the AC voltage AC to the LED driving block 1 so as to operate. In other words, it is possible for the LED driving block 1 to operate with AC power other than a commercial AC voltage inputted thereto.

Figure 17:
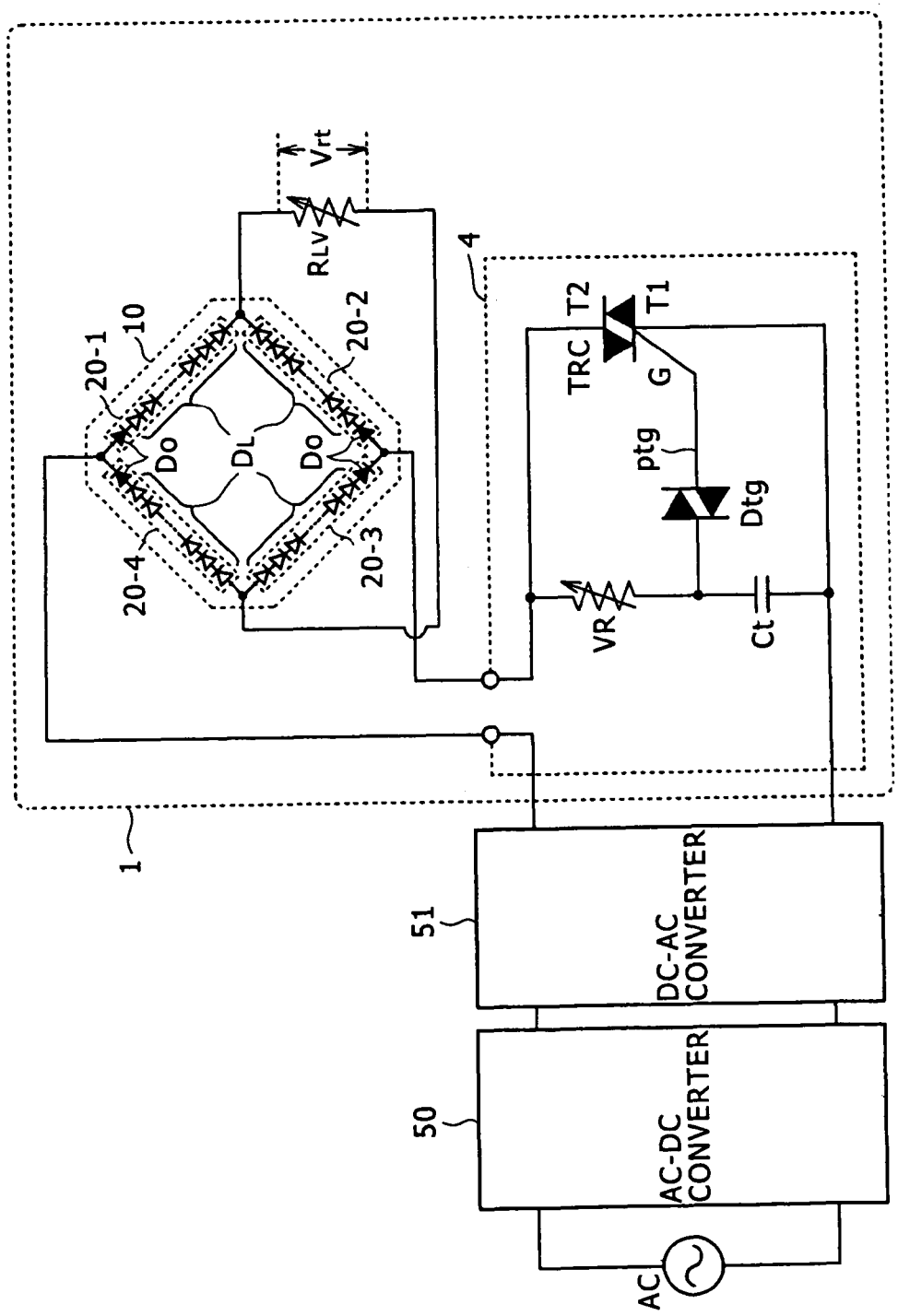
FIG. 17 is a circuit diagram showing an example of a configuration of the LED driving block of FIG. 4 where it is driven by an AC power supply other than a commercial AC power supply.
Figure 18A:
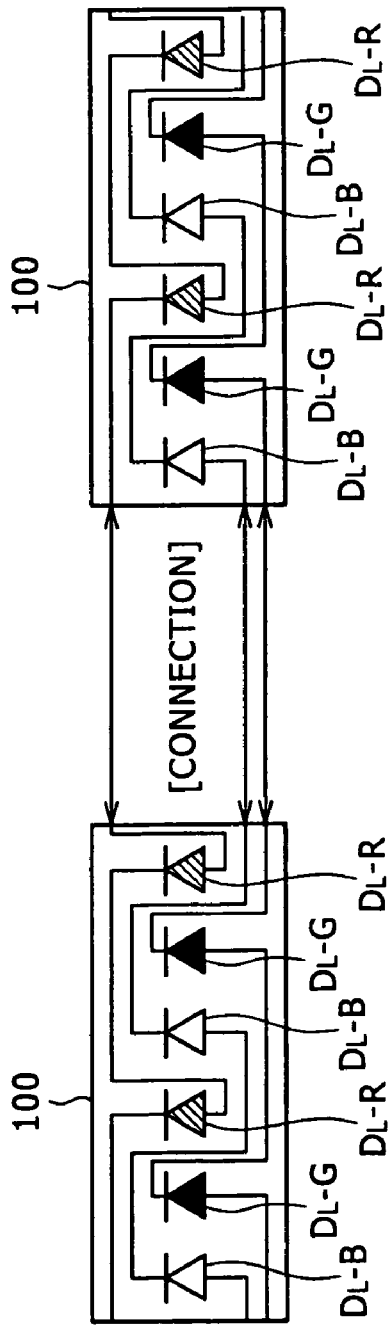
FIGS. 18A and 18B are schematic views showing an example of a structure of an LED cell and an LED cell block used to form a conventional backlight.
Figure 18B:
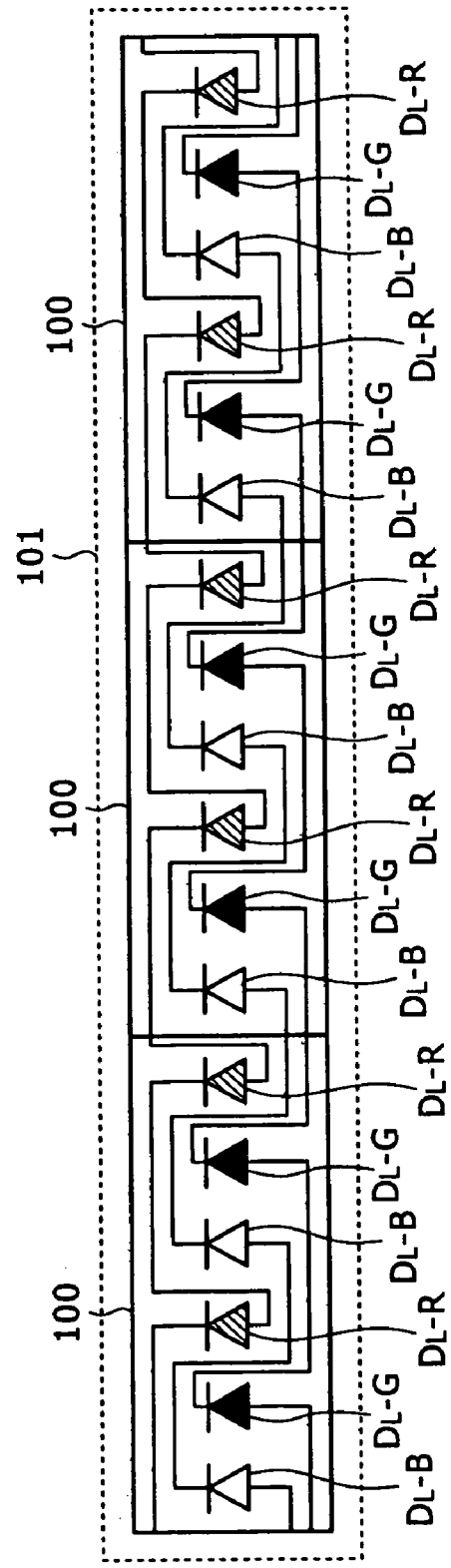
Figure 19:
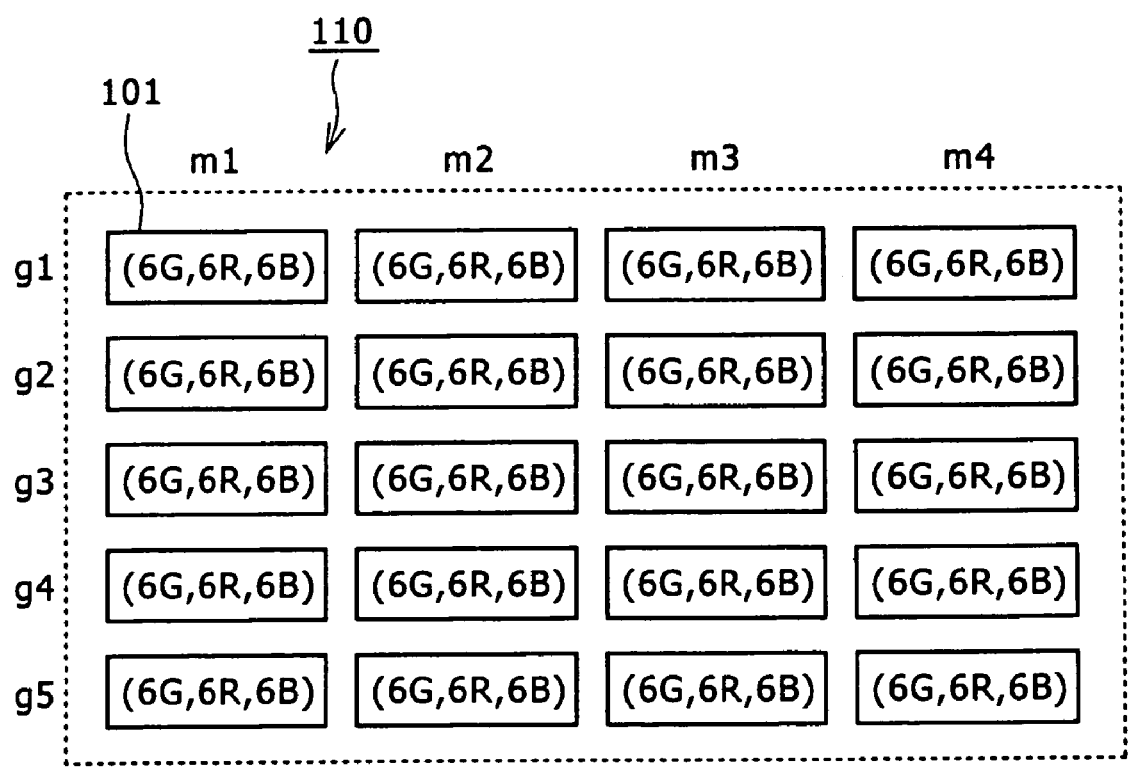
FIG. 19 is a schematic view showing an example of an arrangement pattern of LED cell blocks of a conventional backlight panel.

In particular, for example, a commercial AC voltage AC is converted into a DC voltage by an AC-DC converter 50 (or rectification smoothing circuit) in such a manner as seen in FIG. 17. Then, the output of the AC-DC converter 50 is inputted to a DC-AC converter 51 so that, for example, AC power of a predetermined frequency higher than that of the AC voltage AC is outputted from the DC-AC converter 51. The LED driving block 1 receives and operates with the output of the AC-DC converter 50 as an input thereto. Driving of the LED driving block 1 with AC power according to a high frequency in this manner provides a merit that, since the periods of emission/non-emission of the light emitting diodes DL repeated for every interval of one half wave of the alternating power are shorter, blinking of emitted light can be eliminated readily.

It is to be noted that care should be taken of that, even if the configuration wherein the AC-DC converter 50 and a DC-AC converter are provided as seen in FIG. 17 to drive the LED driving block 1 is adopted, the effect of reduction of the circuit scale is not lost when compared with the conventional configuration. According to the conventional illumination apparatus, it is necessary to provide a DC-DC inverter for each one LED series circuit as described hereinabove with reference to FIG. 20. In contrast, in the illumination apparatus of the present embodiment, an LED driving block in the conventional illumination apparatus corresponds to the diode series circuits 20-1, 20-2, 20-3 and 20-4 each of which is a bridge connection unit which forms an LED bridge circuit. In short, simply it can be considered that the single LED driving block 1 can supply power to the four LED series circuits of the conventional illumination apparatus. Further, as shown in FIG. 9, in the present embodiment, a plurality of LED driving units 1 can be connected in parallel to a common AC input power supply and used in this state. Accordingly, also under the configuration of FIG. 17, a plurality of LED driving units 1 to which an output of a DC-AC converter is connected as an AC input power supply can be provided. In short, in the present embodiment, substantially a plurality of LED series circuits can be connected to a single power conversion system (AC-DC converter 50 and DC-AC converter). In this regard, the LED series circuit is different from the DC-DC converter in the conventional illumination apparatus.

One of possible applications of an illumination apparatus which uses the LED driving block 1 of the present embodiment described hereinabove is a light source (light source section) to be used in a display device which does not use spontaneous light such as an LCD panel. Such a light source apparatus as just described is generally called backlight.

The backlight which uses the LED driving block 1 of the present embodiment may be configured, for example, in the following manner.

First, it is usually requested that the backlight of a display device emit white light. Therefore, as different types of light emitting diodes, light emitting diodes corresponding to the colors of R, G and B are required. Then, a number of light emitting diodes for R, G and B necessary in accordance with the size of an actual backlight panel and so forth are prepared and attached in an appropriate arrangement pattern determined taking various conditions into consideration to a board as a back panel.

Then, the light emitting diodes DL are used to form a circuit as the LED driving block 1 for the light emitting diodes of each of R, G and B, for example, as illustrated in FIG. 9. In this instance, the number of light emitting diodes to be provided in one diode series circuit 20 and so forth should be set taking the voltage drop level by the series groups of the light emitting diodes, actual wiring lines, heat radiation, power consumption and so forth into consideration. Further, as described hereinabove, a plurality of LED driving blocks 1-R, 1-G and 1-B corresponding to the colors of R, G and B may be provided as occasion demands. Also where this backlight is configured, a required number of LED driving blocks 1-R, 1-G and 1-B are provided. The backlight configured in this manner is combined, for example, with an LCD panel to form an LCD image display apparatus.

Further, the illumination apparatus which is based on the LED driving block 1 of the present embodiment can be used also as a light source other than a backlight. For example, it is possible to use the illumination apparatus as a light source, for example, for a projector apparatus which projects an image on a screen and so forth. Further, it is possible to use the illumination apparatus not only as a light source for such a display apparatus as described above but also as an ordinary illumination apparatus. Also where the illumination apparatus is used as an ordinary illumination apparatus, such effects as significant reduction of the circuit scale and reduction of the cost in comparison with the prior art can be achieved. Furthermore, it is possible to dispose light emitting diodes so as to represent suitable characters so that the illumination apparatus may be used as an indicator. From those described above, according to the present invention, light emitting diodes of an arbitrary single color or a plurality of arbitrary colors may be used in accordance with applications without being limited to the three primary colors of light of R, G and B.

Further, if such a situation that light emitting diodes of a sufficiently high withstand voltage are available becomes available in the future, then it is possible to configure an illumination apparatus according to the present invention having the basic configuration shown in FIG. 4.

While a preferred embodiment of the present invention has been described using specific terms, such description is for illustrative purpose only, and it is to be understood that changes and variations may be made without departing from the spirit or scope of the following claims.

The invention claimed is:

1. An illumination apparatus, comprising:
 a plurality of bridge rectification circuits corresponding to respective colors of light,
 each bridge rectification circuit receiving and rectifying an input AC voltage; being formed from a bridge connection of a plurality of unit series circuits each of which is formed from a series connection of a plurality of light emitting diode elements, the number of light emitting diode elements differing between at least two of the unit series circuits; and being associated with a transistor, the input AC voltage being applied across first and second nodes of the bridge rectification circuit, and the transistor having a first end coupled to a third node of the bridge rectification circuit and a second end coupled to a fourth node of the bridge rectification circuit,
 a first one of the unit series circuits including a rectifying diode for coupling the anode side of the first one of the unit series circuits to the first node of the bridge rectification circuit, a second one of the unit series circuits including a rectifying diode for coupling the cathode side of the second one of the unit series circuits to the first node of the bridge rectification circuit, a third one of the unit series circuits including a rectifying diode for coupling the anode side of the third one of the unit series circuits to the second node of the bridge rectification circuit, and a fourth one of the unit series circuits including a rectifying diode for coupling the cathode side of the fourth one of the unit series circuits to the second node of the bridge rectification circuit,
 such that the emitted light quantity for said bridge rectification circuits can be independently controlled,
 one or more of the light emitting diode elements being associated with a fluorescent material for maintaining emission of light from the one or more light emitting diode elements associated with the fluorescent material,
 for each bridge rectification circuit, the driving current for the light emitting diode elements is controlled by the transistor in response to a signal indicative of a comparison between a reference voltage and a voltage indicative of a light quantity output from the light emitting diode elements as measured by a photosensor,
 the reference voltages for at least two of the bridge rectification circuits being set such that when the light outputs of the at least two bridge rectification circuits are combined the combined light output is a desired light output.

2. The illumination apparatus according to claim 1, further comprising a conduction angle variation section for variably controlling the conduction angle of the AC voltage.

3. The illumination apparatus according to claim 2, wherein said conduction angle variation section variably controls the conduction angle in response to a detected quantity of emitted light from said light emitting diode elements.

4. An image display apparatus, comprising:
 a light source section for emitting light as a light source in order to display an image with the light;
 said light source section including a plurality of bridge rectification circuits, each bridge rectification circuit receiving and rectifying an input AC voltage; being formed from a bridge connection of a plurality of unit series circuits each of which is formed from a series connection of a plurality of light emitting diode elements, the number of light emitting diode elements differing between at least two of the unit series circuits; and being associated with a transistor, the input AC voltage being applied across first and second nodes of the bridge rectification circuit, and the transistor having a first end coupled to a third node of the bridge rectification circuit and a second end coupled to a fourth node of the bridge rectification circuit, a first one of the unit series circuits including a rectifying diode for coupling the anode side of the first one of the unit series circuits to the first node of the bridge rectification circuit, a second one of the unit series circuits including a rectifying diode for coupling the cathode side of the second one of the unit series circuits to the first node of the bridge rectification circuit, a third one of the unit series circuits including a rectifying diode for coupling the anode side of the third one of the unit series circuits to the second node of the bridge rectification circuit, and a fourth one of the unit series circuits including a rectifying diode for coupling the cathode side of the fourth one of the unit series circuits to the second node of the bridge rectification circuit, such that the emitted light quantity for said bridge rectification circuits can be independently controlled, one or more of the light emitting diode elements being associated with a fluorescent material for maintaining emission of light from the one or more light emitting diode elements associated with the fluorescent material, for each bridge rectification circuit, the driving current for the light emitting diode elements is controlled by the transistor in response to a signal indicative of a comparison between a reference voltage and a voltage indicative of a light quantity output from the light emitting diode elements as measured by a photosensor, the reference voltages for at least two of the bridge rectification circuits being set such that when the light outputs of the at least two bridge rectification circuits are combined the combined light output is a desired light output.

5. The image display apparatus according to claim 4, wherein said light source section includes said light emitting diode elements corresponding to colors of red, green and blue and synthesizes the lights of said light emitting diode elements corresponding to the colors to emit white light.

6. A liquid crystal display, comprising:
a backlight including a plurality of bridge rectification circuits, each bridge rectification circuit receiving and rectifying an input AC voltage; being formed from a bridge connection of a plurality of unit series circuits each of which is formed from a series connection of a plurality of light emitting diode elements, the number of light emitting diode elements differing between at least two of the unit series circuits; and being associated with a transistor, the input AC voltage being applied across first and second nodes of the bridge rectification circuit, and the transistor having a first end coupled to a third node of the bridge rectification circuit and a second end coupled to a fourth node of the bridge rectification circuit, a first one of the unit series circuits including a rectifying diode for coupling the anode side of the first one of the unit series circuits to the first node of the bridge rectification circuit, a second one of the unit series circuits including a rectifying diode for coupling the cathode side of the second one of the unit series circuits to the first node of the bridge rectification circuit, a third one of the unit series circuits including a rectifying diode for coupling the anode side of the third one of the unit series circuits to the second node of the bridge rectification circuit, and a fourth one of the unit series circuits including a rectifying diode for coupling the cathode side of the fourth one of the unit series circuits to the second node of the bridge rectification circuit, such that the emitted light quantity for said bridge rectification circuits can be independently controlled, one or more of the light emitting diode elements being associated with a fluorescent material for maintaining emission of light from the one or more light emitting diode elements associated with the fluorescent material, for each bridge rectification circuit, the driving current for the light emitting diode elements is controlled by the transistor in response to a signal indicative of a comparison between a reference voltage and a voltage indicative of a light quantity output from the light emitting diode elements as measured by a photosensor, the reference voltages for at least two of the bridge rectification circuits being set such that when the light outputs of the at least two bridge rectification circuits are combined the combined light output is a desired light output.

7. The liquid crystal display according to claim 6, wherein each of said unit series circuits includes a diode element connected in series to said plurality of light emitting diode elements, said diode element having a predetermined voltage withstanding property higher than that of said light emitting diode elements.

8. The liquid crystal display according to claim 6, further comprising a conduction angle variation section for variably controlling the conduction angle of the AC voltage.

9. The liquid crystal display according to claim 8, wherein said conduction angle variation section variably controls the conduction angle in, response to a detected quantity of emitted light from said light emitting diode elements.

10. The liquid crystal display according to claim 6, wherein said light emitting diode elements include light emitting diode elements corresponding to colors of red, green and blue and the display synthesizes the lights of said light emitting diode elements corresponding to the colors to emit white light.

* * * * *